United States Patent
Naka et al.

(10) Patent No.: US 7,557,545 B2
(45) Date of Patent: Jul. 7, 2009

(54) ELECTRIC POWER UNIT OPERATING IN CONTINUOUS AND DISCONTINUOUS CONDUCTION MODES AND CONTROL METHOD THEREFOR

(75) Inventors: Toshiyuki Naka, Fuchu (JP); Akio Nakagawa, Chigasaki (JP); Kazutoshi Nakamura, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 308 days.

(21) Appl. No.: 11/485,466

(22) Filed: Jul. 13, 2006

(65) Prior Publication Data

US 2007/0013351 A1    Jan. 18, 2007

(30) Foreign Application Priority Data

Jul. 14, 2005   (JP) .............................. 2005-206086
Jul. 7, 2006    (JP) .............................. 2006-187292

(51) Int. Cl.
 *G05F 1/618* (2006.01)
(52) U.S. Cl. ...................... 323/223; 323/283; 323/285
(58) Field of Classification Search ................ 323/223, 323/283, 282, 285, 284; 363/127
See application file for complete search history.

(56) References Cited

U.S. PATENT DOCUMENTS

| | | | | |
|---|---|---|---|---|
| 6,815,936 B2* | 11/2004 | Wiktor et al. | ................ | 323/282 |
| 6,861,826 B2* | 3/2005 | Lynch | .......................... | 323/224 |
| 7,098,640 B2* | 8/2006 | Brown | .......................... | 323/283 |
| 7,391,194 B2* | 6/2008 | Brown | .......................... | 323/283 |
| 2005/0281058 A1* | 12/2005 | Batarseh et al. | ................ | 363/16 |
| 2006/0152204 A1* | 7/2006 | Maksimovic et al. | ....... | 323/284 |
| 2007/0013351 A1 | 1/2007 | Naka et al. | | |

OTHER PUBLICATIONS

Vahid Yousefzadeh, Dragan Maksimovic; Sensorless Optimization of Dead Times in DC-DC Converters with Sychrnonous Rectifiers; APEC—Applied Power Electronics Conference and Exposition 2005; Jan. 2005; vol. 2; pp. 911-918.*
Steve Mappus, "Predictive Gate Drive™ Boosts Synchronous DC/DC Power Converter Efficiency", Texas Instruments Application Report, SLUA281, Apr. 2003, pp. 1-26.
U.S. Appl. No. 11/742,895, filed May 1, 2007, Naka.

* cited by examiner

*Primary Examiner*—Akm E Ullah
*Assistant Examiner*—Harry Behm
(74) *Attorney, Agent, or Firm*—Oblon, Spivak, McClelland, Maier & Neustadt, P.C.

(57) ABSTRACT

An electronic power unit includes first and second MOS transistors and a digital control circuit. The first MOS transistor applies a voltage to the load. The second MOS transistor remains on while the first MOS transistor remains off and rectifies the current flowing in the load. The digital control circuit turns on the first transistor upon lapse of a first time interval from the time the second MOS transistor is turned off. The digital control circuit turns on the second MOS transistor upon lapse of a second time interval from the time the first MOS transistor is turned off. The digital control circuit controls the on-period of the first MOS transistor so that the voltage applied to the load is constant in a discontinuous conduction mode. The digital control circuit determines, while the voltage applied to the load is constant, an optimal value of the first time from the duty.

12 Claims, 17 Drawing Sheets

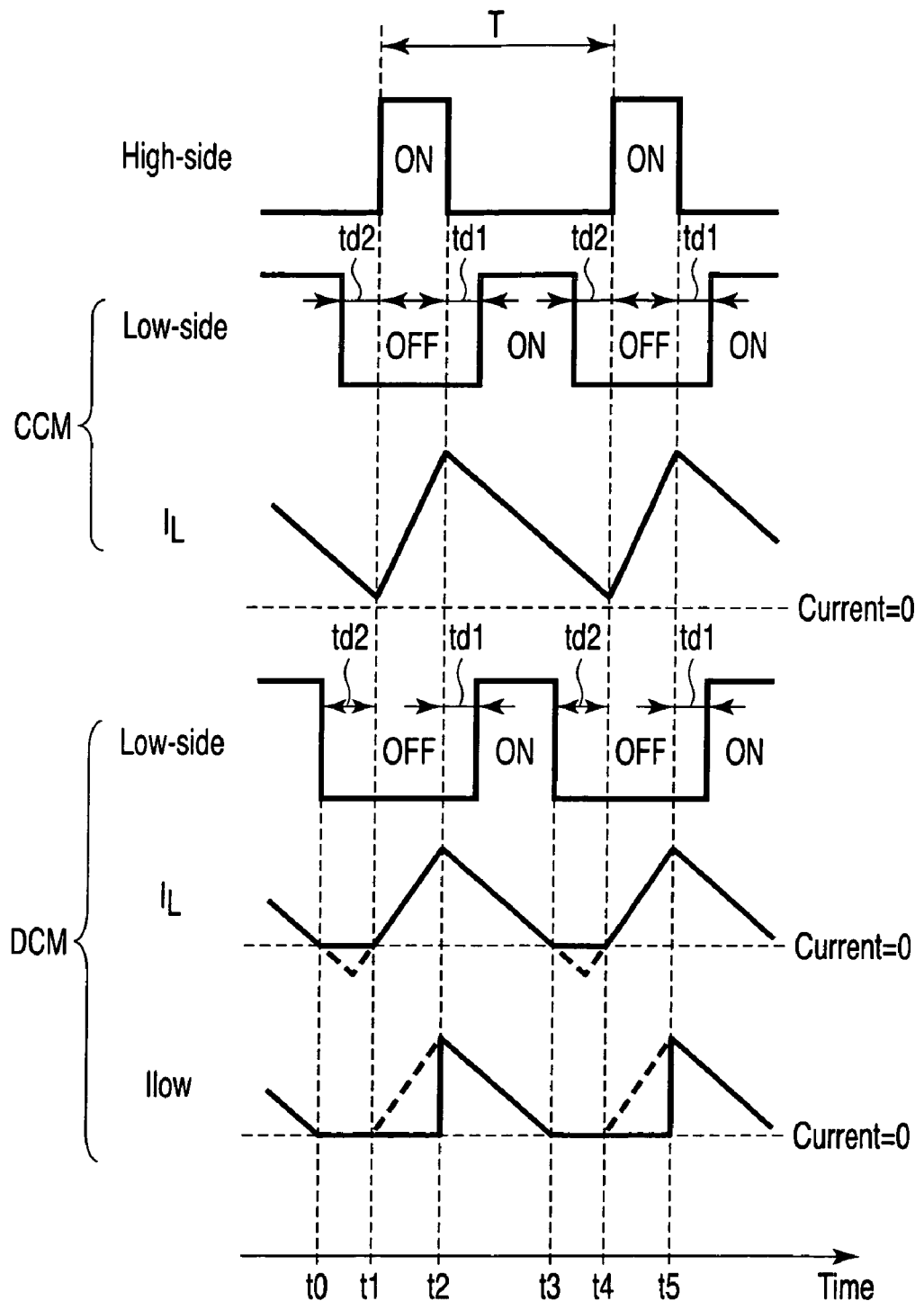
F I G. 2

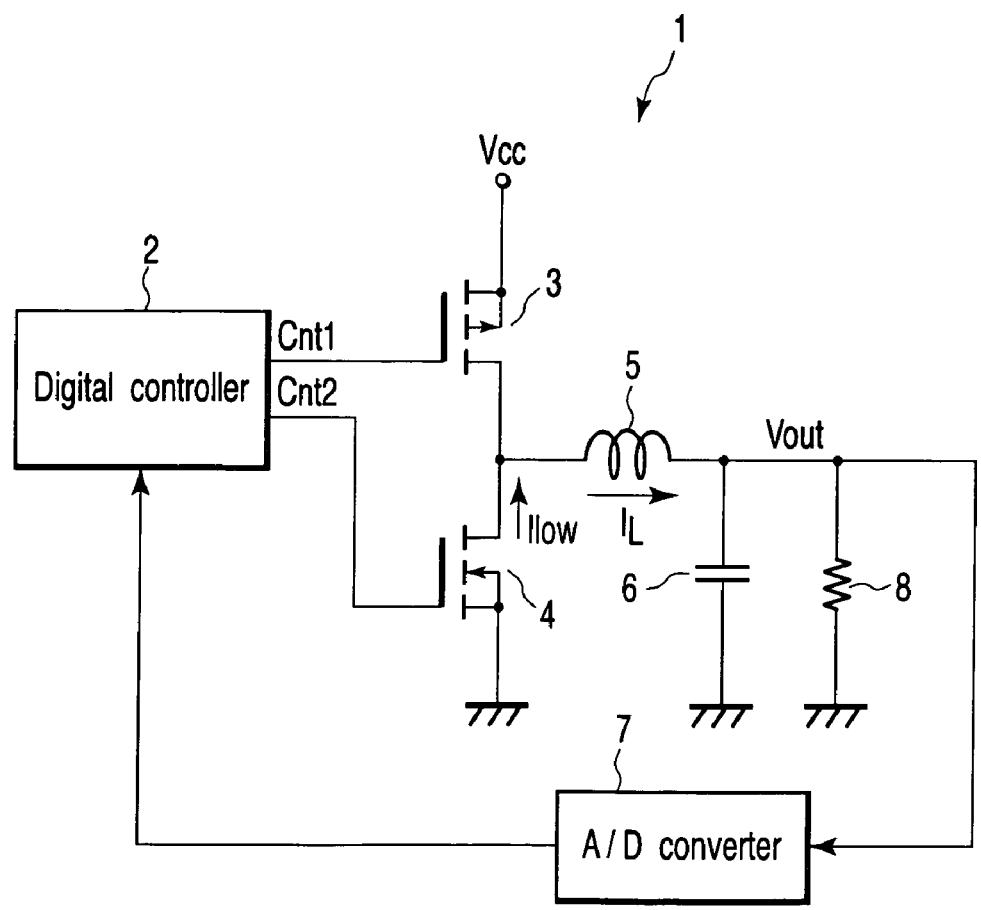
F I G. 20

US 7,557,545 B2

ELECTRIC POWER UNIT OPERATING IN CONTINUOUS AND DISCONTINUOUS CONDUCTION MODES AND CONTROL METHOD THEREFOR

CROSS-REFERENCE TO RELATED APPLICATIONS

This application is based upon and claims the benefit of priority from prior Japanese Patent Applications No. 2005-206086, filed Jul. 14, 2005; and No. 2006-187292, filed Jul. 7, 2006, the entire contents of both of which are incorporated herein by reference.

BACKGROUND OF THE INVENTION

1. Field of the Invention

The present invention relates to an electric power unit and a control method therefor and more specifically to the dead time control of a DC-DC converter.

2. Description of the Related Art

Conventionally, a DC-DC converter is known which is equipped with a low-side switch and a high-side switch. For such a DC-DC converter, to increase the efficiency it is important to optimize the dead time.

A dead time optimizing method which involves monitoring the duty and setting the dead time at which the duty is minimum as the optimum value has been proposed in "Sensorless Optimization of Dead Times in DC-DC converters with Synchronous Rectifiers" by Vahid Yousefzadeh et al., APEC, 2005, pp. 911 to 917. This method employs the feature that the efficiency of the DC-DC converter becomes maximum at the point at which the duty is minimum. The duty refers to the ratio of the on-period of the high-side switch to the sum of the on- and off-periods in one cycle.

However, the above method merely proposes optimization of dead times in the continuous conduction mode (CCM) in which the current flowing in the inductor always takes a value of more than zero (current flowing in the direction of load is defined to be positive). That is, the method does not take into consideration the discontinuous conduction mode (DCM) in which the current may become zero or negative. Therefore, the efficiency in the discontinuous conduction mode cannot be increased enough.

BRIEF SUMMARY OF THE INVENTION

An electronic power unit according to an aspect of the present invention, the unit having a continuous conduction mode in which a current flowing in the load is more than zero and a discontinuous conduction mode in which a current flowing in the load takes a negative value or zero for a specific period, the unit comprising:

a first MOS transistor which applies a voltage to the load;

a second MOS transistor which remains on while the first MOS transistor remains off and which rectifies the current flowing in the load;

a digital control circuit which turns on the first transistor upon lapse of a first time interval from the time the second MOS transistor is turned off and which turns on the second MOS transistor upon lapse of a second time interval from the time the first MOS transistor is turned off, the digital control circuit controlling the on-period of the first MOS transistor so that the voltage applied to the load is constant in the discontinuous conduction mode, and determining, while the voltage applied to the load is constant, an optimal value of the first time from the duty which is the ratio of the on-period to the sum of the on- and off-periods of the first MOS transistor in one cycle.

A method of controlling an electric power unit according to an aspect of the present invention, the unit including a first MOS transistor which applies a voltage to a load and a second MOS transistor which rectifies a current flowing in the load, the first and second MOS transistors being turned on alternately, and in which, in a discontinuous conduction mode in which the current takes a negative value or zero for a specific period, the first MOS transistor being turned on after the lapse of a first time interval from the time the second MOS transistor is turned off and the second MOS transistor being turned on after the lapse of a second time interval from the time the first MOS transistor is turned off, the method comprising:

setting the first time interval to an initial value;

decreasing or increasing the first time interval from the initial value with the voltage applied to the load kept constant to decrease a duty;

when the duty decreases in decreasing the first time interval, continue decreasing the first time interval with the voltage applied to the load kept constant until the duty starts increasing;

when the duty decreases in increasing the first time interval, continue increasing the first time interval with the voltage delivered to the load kept constant until the duty starts increasing; and determining an optimal value of the first time interval according to the first time interval at which the duty immediately before the duty starts increasing is obtained.

BRIEF DESCRIPTION OF THE SEVERAL VIEWS OF THE DRAWING

FIG. 2 is a timing diagram illustrating the operation of the DC-DC converter shown in FIG. 1;

FIG. 20 is a schematic and block diagram representation of a DC-DC converter according to a modification of the first embodiment of the present invention;

DETAILED DESCRIPTION OF THE INVENTION

Figure 1:
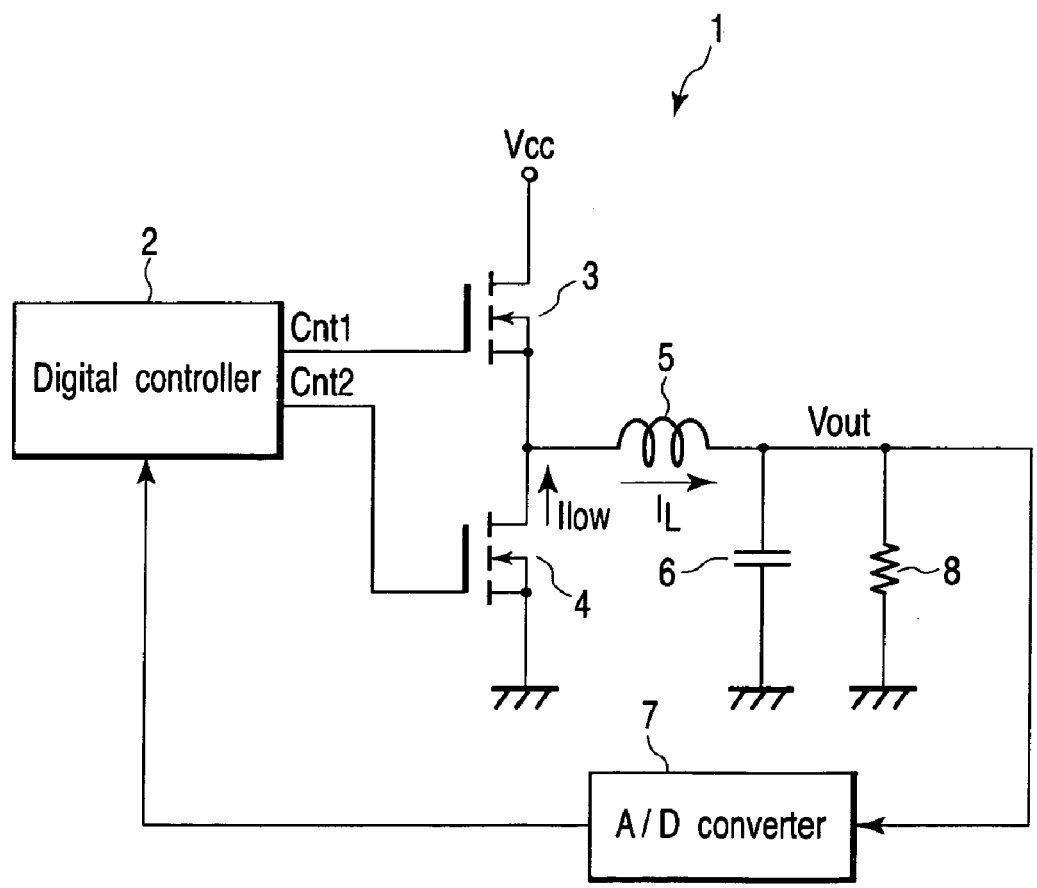
FIG. 1 is a schematic and block diagram representation of a DC-DC converter of a first embodiment of the present invention.

Reference is now made to FIG. 1 to describe an electronic power unit and a control method therefor according to a first embodiment of the present invention. FIG. 1 is a schematic and block diagram representation of a buck converter (hereinafter referred to as a DC-DC converter) of the first embodiment.

As shown, the DC-DC converter 1 comprises a digital controller 2, a high-side switch 3, a low-side switch 4, an inductor 5, a capacitor 6, and an analog-to-digital (A/D) converter 7. The digital controller 2 controls the high- and low-side switches 3 and 4 by control signals Cnt1 and Cnt2, respectively. The high-side switch 3 is comprised of an n-channel MOS transistor having its drain connected to a supply voltage Vcc and its gate connected to receive the control signal Cnt1. The low-side switch 4 is comprised of an n-channel MOS transistor having its drain connected to the source of the high-side switch 3, its gate connected to receive the control signal Cnt2, and its source connected to ground. The inductor 5 has its one end connected to the connection node of the high- and low-side switches 3 and 4 and its other end connected to one electrode of the capacitor 6 the other electrode of which is connected to ground. The connection node of the inductor 5 and the capacitor 6 forms the output node at which an output voltage Vout is taken. The A/D converter 7 converts the output voltage Vout into digital data and outputs it to the digital controller 2. To the output node of the DC-DC converter 1 is connected a load (a resistor 8 in FIG. 1).

The operation of the DC-DC converter 1 thus arranged will be described with reference to FIG. 2, which is a timing diagram illustrating the operations of the converter in the continuous and discontinuous conduction modes.

The operation in the continuous conduction mode will be described first. The high-side switch 3 and the low-side switch 4 are alternately turned on by the digital controller 2. At this point, the digital controller controls the switches 3 and 4 so that they will not be turned on simultaneously. That is, the low-side switch 4 is turned on after the lapse of a time interval td1 from the time that the high-side switch 3 is turned off and the high-side switch 3 is turned on after the lapse of a time interval td2 from the time that the low-side switch 4 is turned off. This is intended to prevent both the switches from being turned on simultaneously. If both the switches were turned on simultaneously, reactive current would flow from Vcc to ground without being supplied to the load, which would result in a significant decrease in the efficiency. The times td1 and td2 set for such a purpose are dead times. If the dead times td1 and td2 are set too long, the period during which current flows in the body diode parasitically present in the low-side switch 4 will become long. The on voltage of the body diode is higher than that of the low-side switch 4 (gate-to-source voltage>threshold voltage). Therefore, setting the dead times too long also results in a reduction in the efficiency. The ratio of the on-period of the high-side switch 3 to the period T of one cycle (the sum of on- and off-periods) is the duty D. The efficiency of the DC-DC converter 1 is inversely proportional to D. That is, the efficiency of the DC-DC converter is maximum when the duty D is minimum. During the interval that the high-side switch 3 is on, i.e., the interval from t1 to t2 or from t4 to t5 in FIG. 2, the supply voltage Vcc is applied to the inductor 5 and hence the current IL that flows in the inductor increases with an inclination of (Vin−Vout)/L where Vin is an input voltage and corresponds to Vcc in FIG. 1), L is inductance of the inductor 5. Conversely, during the interval that the high-side switch 3 is off, the voltage is discharged through the low-side switch 4 and hence the current IL decreases. As described previously, in the continuous conduction mode the current IL always takes values of more than zero.

Next, the discontinuous conduction mode will be described. Unlike the continuous conduction mode, in the discontinuous conduction mode the current IL can take zero or negative values. Even in the discontinuous conduction mode, as in the continuous conduction mode, the high-side switch 3 and the low-side switch 4 are alternately turned on. The digital controller 2 controls both the switches 3, 4 so that they are not turned on simultaneously. The interval td1 from the time the high-side switch 3 is turned off to the time the low-side switch 4 is turned on is the dead time set up for preventing both the switches from being turned on simultaneously as in the continuous conduction mode. Even in the discontinuous conduction mode, on the other hand, the high-side switch 3 is turned on upon the lapse of time td2 from the time the low-side switch 4 is turned off; however, td2 is not the dead time. In the discontinuous conduction mode, if the low-side switch 4 is kept on, the current IL will fall to a negative value. In other words, that the current IL becomes negative means that a reverse current flows in the circuit, causing the efficiency of the DC-DC converter 1 to decrease. With the DC-DC converter of the present embodiment, therefore, the low-side switch 4 is turned off at times t0, t3 at which the current IL decreases to zero (at times immediately before the current IL becomes negative). That is, the time td2 in the discontinuous conduction mode is not the dead time but is set to prevent the current IL from becoming negative. Hereinafter, we refer to the time td2 in the discontinuous conduction mode as the cutoff time for distinction from the dead time.

Next, a description is given of the method of setting the cutoff time td2 in the discontinuous conduction mode of the DC-DC converter of the present embodiment. Note that the dead times td1 and td2 in the continuous conduction mode and the dead time td1 in the discontinuous conduction mode can be set in accordance with the conventional method.

Figure 3:
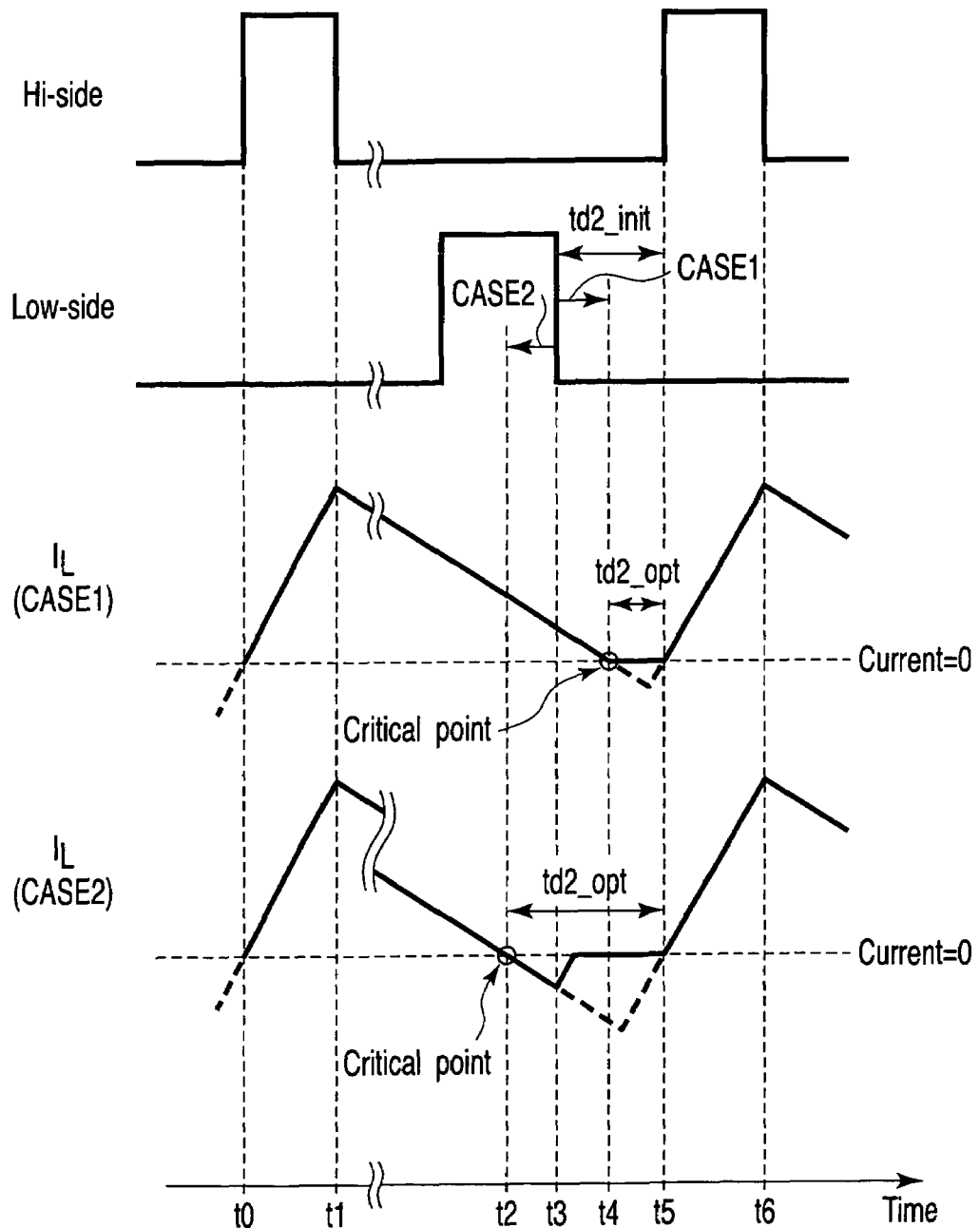
FIG. 3 is a timing diagram illustrating the operation of the DC-DC converter shown in FIG. 1.

The method will be described first using FIG. 3, which is a timing diagram illustrating the cutoff time setting method. In this embodiment, the duty D is monitored in order to set the cutoff time td2. The value at the point of time that the duty D becomes minimum by changing the length of the cutoff time td2 is set as the optimum value. The optimum value of the cutoff time at which the duty D becomes minimum corresponds to the point at which the efficiency becomes maximum, that is, the point at which the current IL becomes zero. It can therefore be said that finding the optimum value of the cutoff time corresponds, in other words, to finding the point at which the current IL becomes zero.

As shown, td2_init is first set as the initial value of the cutoff time. The cutoff time is then changed gradually from the initial value td2_init. At this point, two cases are considered; the case where the current IL becomes zero after the low-side switch 4 has been turned off (CASE 1), and the case where the current IL becomes zero before the low-side switch is turned off (CASE 2). In CASE 1, the optimum value td2_opt is found by reducing the cutoff time from the initial value td2_init. In CASE 2, the optimum value td2_opt is found by increasing the cutoff time from the initial value td2_init. In CASE 1, the current which flows during the interval from t3 to t4 is one that flows through the body diode in the source drain path of the low-side switch 4, which causes the efficiency to be reduced as described previously.

Next, a specific method of searching for the cutoff time optimum value will be described using FIG. 4, which is a flowchart for the optimum value searching method.

First, to make the current IL constant, the digital controller 2 places the DC-DC converter 1 in the steady state and then set the cutoff time td2 to the initial value td2_init (step S1). The digital controller 2 resets the duty D as well each time it resets the cutoff time td2. The efficiency of the DC-DC converter 1, i.e., the output voltage Vout, changes with the cutoff time td2. Thus, the duty D is set to a new value so that the output voltage Vout is kept constant. The time td2 at this point is taken to be temporary optimum value td2_opt (step S2) and the duty D is taken to be Dold (step S3).

Next, the cutoff time td2 is changed to td2-Δt (step S4). That is, the cutoff time is set Δt shorter than td2_init. The length of Δt is not particularly limited but the shorter it is, the more accurate the optimum value will be. Then, whether or not the duty D has increased is detected (step S5). If the duty D has not increased but has decreased (step S6), then the procedure returns to step S2. If, on the other hand, the duty D has not decreased, that is, if D=Dold (NO in step S6), then the procedure returns to step S3.

When the decision in step S5 is that the duty D has increased, td2 at that point is taken as the temporary optimum value td2_opt (step S7). Next, td2 is set to the temporary optimum value td2_opt (step S8). The duty D at this point is taken as Dold (step S9).

Next, the cutoff time td2 is changed to td2+Δt (step S10). That is, td2 is set Δt longer than the up-to-date temporary optimum value td2_opt. Then, whether or not the duty D has increased is detected (step S11). If D has increased in step S11, td2 at which D (Dold) immediately before that point was obtained is set at the final optimum value td2_opt.

If D has not increased in step S11 but has decreased (YES in step S12), then the procedure returns to step S8. If, on the other hand, D has not decreased, that is, if D=Dold (NO in step S12), then the procedure returns to step S9.

Next, the application of the above method to CASE 1 and CASE 2 described with reference to FIG. 3 will be described using FIGS. 5 and 6, which are graphs illustrating the relationship between cutoff time and duty D for CASE 1 and CASE 2, respectively.

First, CASE 1 will be explained with reference to FIG. 5. In CASE 1, the time that defines initial value td2_init precedes the time when IL=0. When td2 is decreased gradually beginning with td2_init in step S4, the duty D decreases at t=t0 (steps S5 and S6). Steps S2 through S6 are repeated until D shifts to increasing. Then, D shifts to increasing at time t2 and the procedure goes to step S7. That is, td2 is set to the preceding td2_opt obtained at time t1. Then, the duty D naturally decreases. When td2 is increased in step S10, D increases at time t3 (step S11). As the result, td2 at that time is taken as the optimum value td2_opt (step S13).

Next, CASE 2 will be described with reference to FIG. 6. In CASE 2, the time that defines the initial value td2_init succeeds the time when IL=0. Therefore, when td2 is gradually decreased beginning with td2_init in step S4, D does not decrease but increases at time t0 (step S5). The procedure thus goes to step S7. That is, CASE 2 corresponds to the case where the processing starts at either of the times t1 and t2 before the duty first shifts to increasing in CASE 1.

When td2 is increased in step S10, D decreases (steps S11 and S12). Steps S8 through S12 are repeated until D shifts to increasing. Supposing that D shifts to increasing at time t3 (step S11), td2 at which the preceding D (Dold) is obtained is taken as the optimum value td2_opt (step S13). That is, td2 obtained at time t2 is set as the final optimum value td2_opt.

In this way, the cutoff time td2 can be optimized. After that, the DC-DC converter operates on the basis of the optimized cutoff time td2_opt.

There are intervals when D makes no change even if td2 is increased or decreased. The length of intervals when D makes no change varies according to the operating conditions of the circuit, the size of the load, and the value of Δt. For example, when the switching frequency is high, since the number of times of switching per unit time increases, the dependence of D on changes in td2 increases. That is, the higher the switching frequency, the shorter the interval in which D makes no change.

As described above, the effects described below can be obtained by the DC-DC converter according to the present embodiment.

(1) The efficiency of the DC-DC converter can be increased even in the discontinuous conduction mode.

The duty D is monitored while changing the cutoff time td2 and the value of the cutoff time when D becomes minimum is taken as its optimum value td2_opt. More specifically, by shortening or lengthening the cutoff time td2 according to cases, a search is made for the cutoff time at which the duty D is minimum, that is, the current IL is zero. The duty D is grasped by the digital controller 2 which controls the highand low-side switches 3 and 4. There is no need of detecting the current IL with a sensor. Therefore, the cutoff time can be optimized simply with no sensor and the efficiency of the DC-DC converter in the discontinuous conduction mode can be increased.

Figure 4:
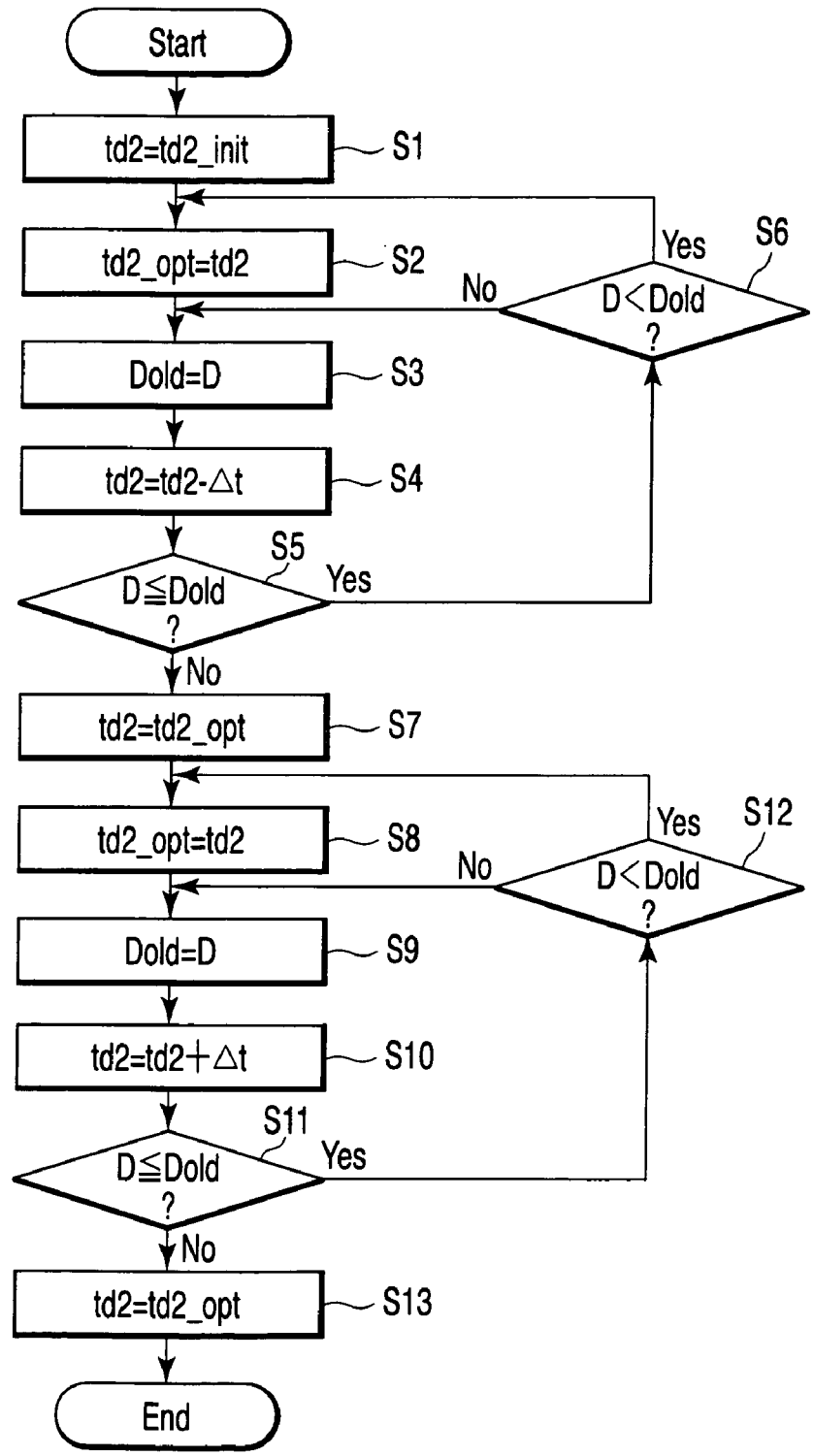
FIG. 4 is a flowchart for the detection of the cutoff time optimum value in the DC-DC converter shown in FIG. 1.

In the example of FIG. 4, the cutoff time is first shortened in step S4 and then lengthened in subsequent steps. However, the cutoff time may be lengthened first to search for the point at which the duty D increases and then shortened.

Figure 7:
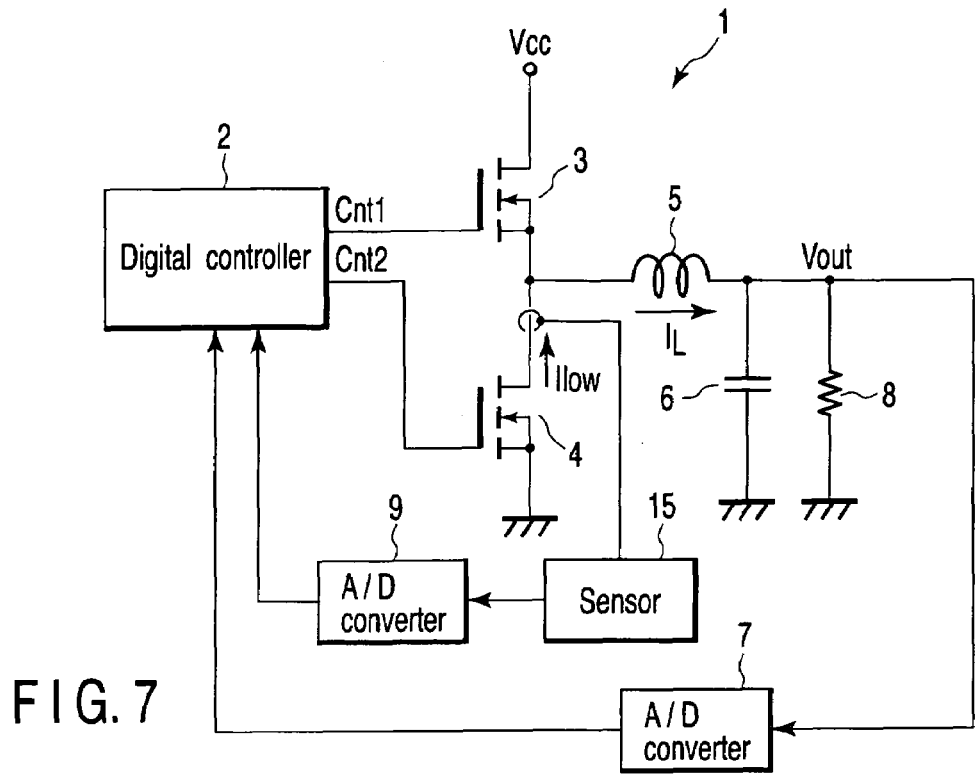
FIG. 7 is a schematic and block diagram representation of a DC-DC converter of a second embodiment of the present invention.

Next, a description is given of an electric power unit and a control method therefore according to a second embodiment of the present invention with reference to FIG. 7, which is a schematic and block diagram representation of a DC-DC converter of the second embodiment. In the second embodiment, in the cutoff time optimization method described in the first embodiment, the initial value of the cutoff time is determined on the basis of a current value detected using a sensor and the low-side switch 4 is turned off after a set period of time from the time at which a certain current value is detected.

As shown in FIG. 7, the DC-DC converter 1 of the second embodiment has a sensor 15 and an A/D converter 9 added to the arrangement shown in FIG. 1. The sensor 15 detects a current Ilow flowing through the low-side switch 4. The sensor may detects a current itself or a voltage drop. The A/D converter 9 converts the result detected by the sensor into digital data and then outputs it to the digital controller 2.

Figure 8:
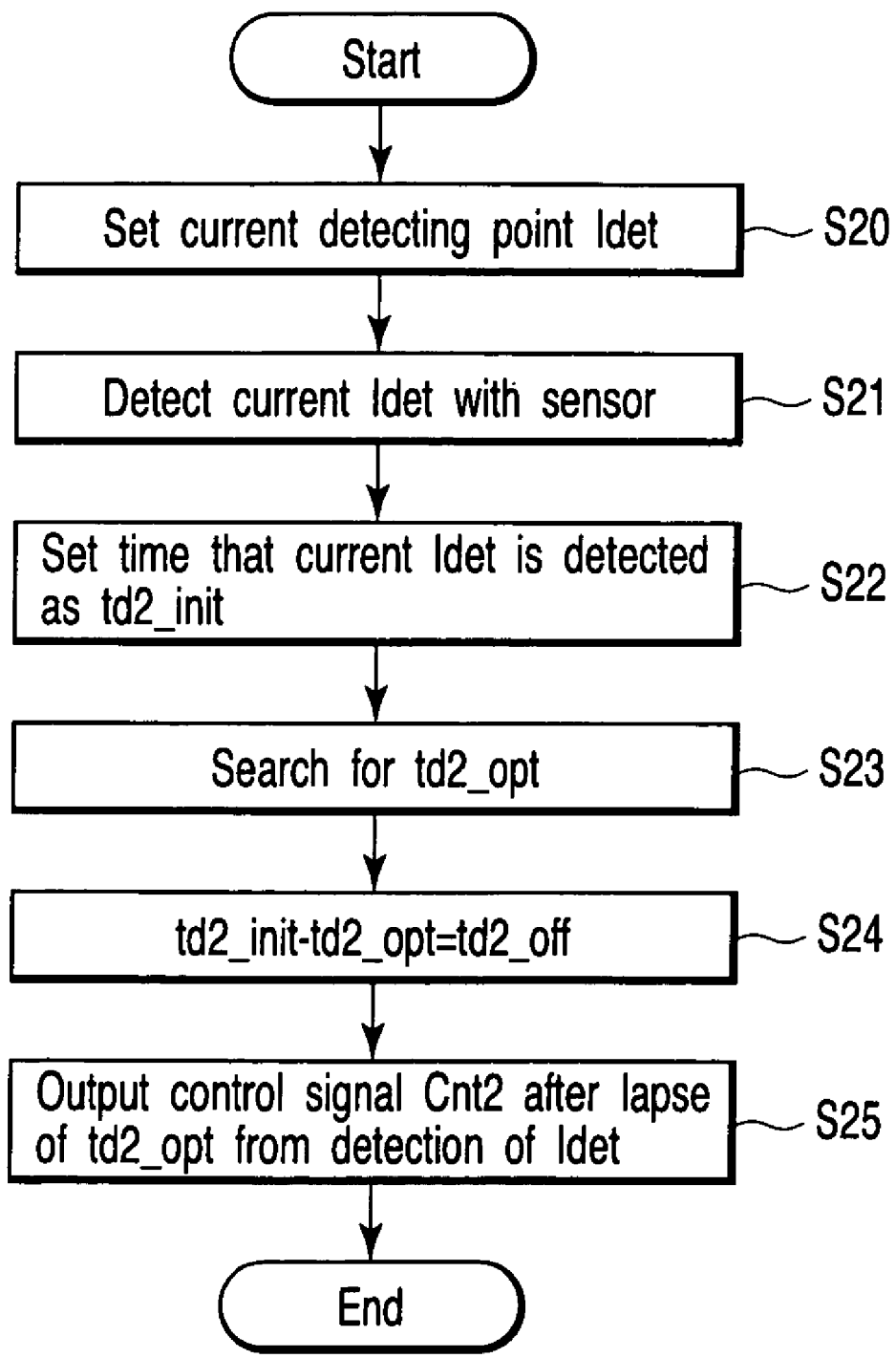
FIG. 8 is a flowchart for the control of the low-side switch in the DC-DC converter shown in FIG. 7.
Figure 9:
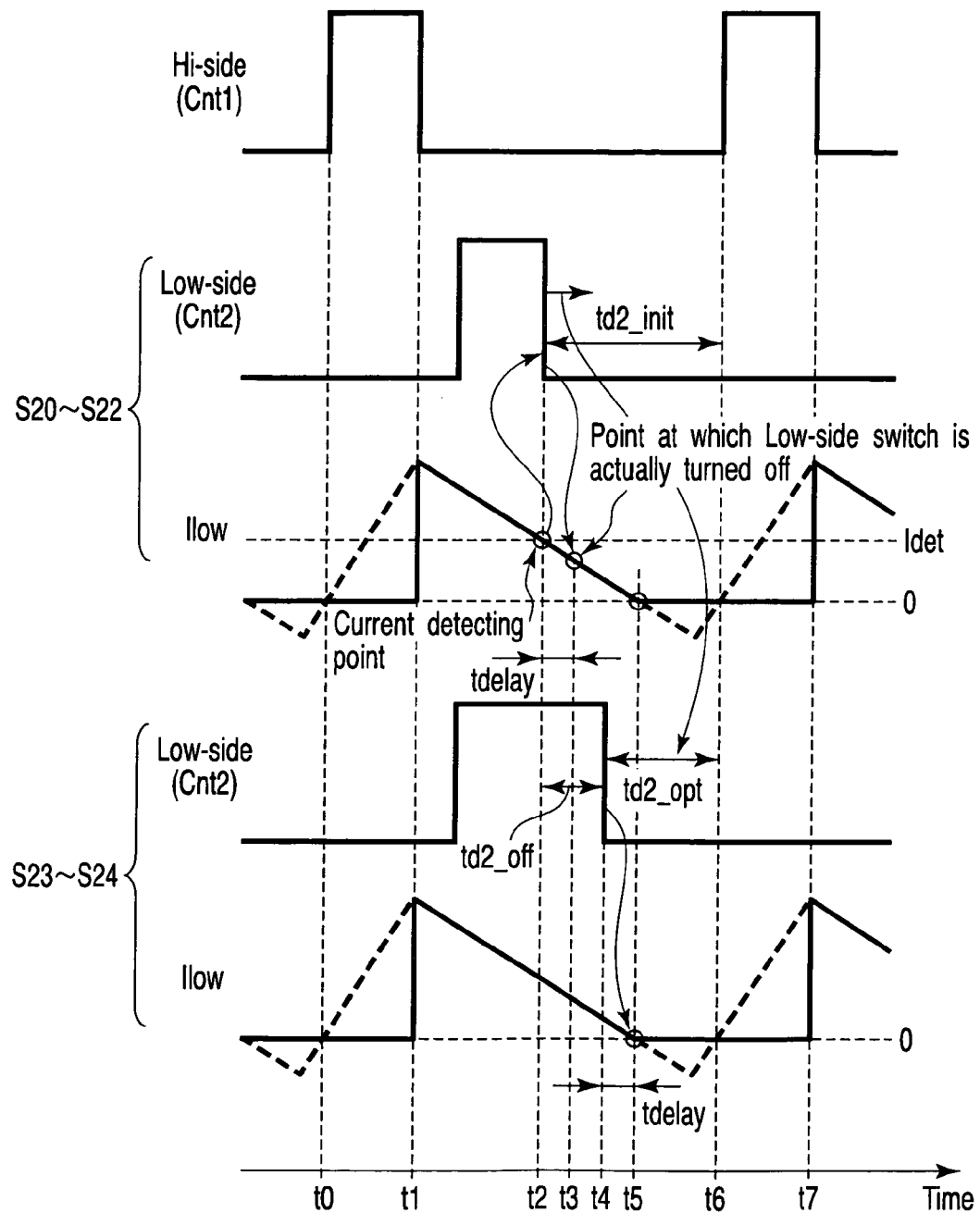
FIG. 9 is a timing diagram illustrating the operation of a DC-DC converter according to a third embodiment of the present invention.

Next, the method of setting the cutoff time td2 by the digital controller 2 will be described with reference to FIGS. 8 and 9. FIG. 8 is a flowchart for the method of controlling the high- and low-side switches 3 and 4 in accordance with the second embodiment. FIG. 9 is a timing diagram illustrating the cutoff time setting method. Semiconductor devices forming not only DC-DC converters but semiconductor integrated circuits are subject to variations in characteristics. Not all of the semiconductor devices contained have ideal characteristics. For example, suppose in FIG. 9 that an off pulse is output at time t2 (that is, the control signal Cnt2 is set low) in order to turn off the low-side switch 4. However, in practice, it is at time t3 that the low-side switch 4 is turned off. That is, the low-side switch is turned off after a delay of a given time (t delay) from the time when the off pulse is output. This delay makes it difficult to use the result of detection of that the current Ilow is zero by the sensor 15 as it is in controlling the low-side switch 4. The same holds true for the optimum value td2_opt of the cutoff time obtained in the first embodiment. That is, the off pulse is output earlier than the time at which the low-side switch 4 is actually turned off by the delay time (t delay).

In the second embodiment, a search is made for the optimum timing of outputting an off pulse to the low-side switch 4, including the aforementioned delay. First, an arbitrary value (current detecting point) Idet (for example, 0.5 mA) is set for the current Ilow (step S20). Next, the sensor 15 monitors the current Ilow and detects the current value Idet (step S31). The result of detection is converted by the A/D converter 9 into digital data and the digital data is sent to the digital controller 2. The digital controller then sets the time at which the current value Idet is detected as the initial value td2 init (step S22). For steps S20 to S22, see FIG. 9.

Next, the digital controller 2 searches for the optimum value td2_opt of the cutoff time td2 in accordance with the method described in the first embodiment (step S23). When the optimum value td2_opt is determined, the digital controller 2 calculates the time difference td2_off between the initial value td2_init and the optimum value td2_opt (step S24) and holds it. For steps S23 and S24, see FIG. 9.

After that, the digital converter 2 outputs an off pulse to the low-side switch 4 after the lapse of td2_off from the time at which Ilow=Idet is detected by the sensor 15.

According to the DC-DC converter of the second embodiment, the following effect (2) is obtained.

(2) The efficiency of the DC-DC converter can be easily increased even in the discontinuous conduction mode.

With the DC-DC converter of the second embodiment, a certain current value is searched for using a sensor and the detected point is used as the initial value td2_init of the cutoff time td2. The current value detected by the sensor 15 may contain an error. Therefore, even if a current value of zero is detected by the sensor 15, the actual current value may be not zero. Therefore, difficulties may be involved in accurately controlling the low-side switch 4 on the basis of the result of detection by the sensor 15.

In the second embodiment, therefore, a certain reference current value Idet is set in order to compensate for the error. The time at which Idet is detected is set as the initial value td2_init of the cutoff time td2 to search for the optimum value td2 opt. Then, as shown in FIG. 9, the time after the lapse of td2_off (=td2_init−td2_opt) from the detection of Idet is set as the time to output an off pulse to the low-side switch 4 to thereby make Ilow zero.

After that, therefore, the digital controller 2 simply checks whether or not the current Ilow has attained Idet using the sensor 15 and, upon the lapse of td2_off from the detection of Idet, outputs an off pulse. Such compensation for variations in characteristics of semiconductor devices, once made, need not be made anew after that. The reason is that variations in characteristics are specific to each chip. Therefore, it is only required to make the compensation only at the time of manufacture of the DC-DC converter or at regular intervals. Even if the output current of the DC-DC converter varies, it is not necessary to change the timing of turning off the low-side switch 4. This is because the time for the current Ilow to change from Idet to zero remains unchanged unless the inclination of current varies.

It is desirable that the current detecting point Idet be a positive value close to zero. This is because the use of a value close to zero allows the processing described with reference to FIGS. 4 to 6 to converge quickly. That is, little change in the cutoff time td2 is required and the search for the optimum value can be made easily.

In FIG. 9, the current value Idet is taken to be positive but may be zero or negative. In detecting a negative value, the current Ilow has already passed zero in that cycle and it is therefore in the next cycle or thereafter that the optimum value td2_opt is found. In contrast, in detecting a positive value, the optimum value td2_opt can be found within that cycle.

Figure 10:
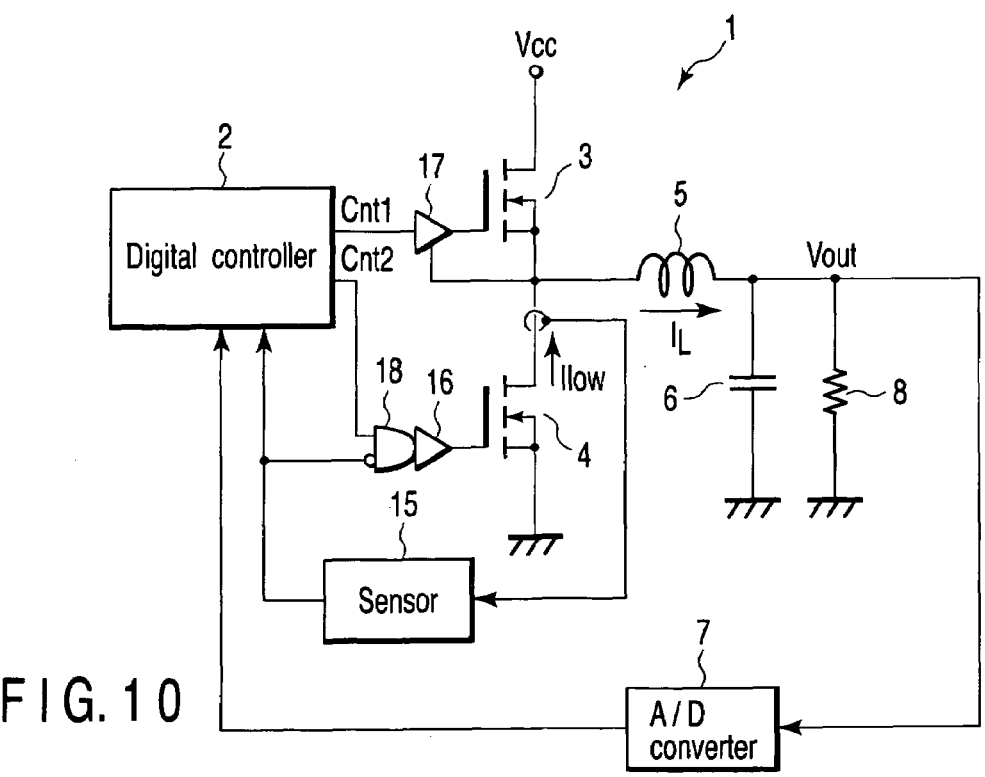
FIG. 10 is a schematic and block diagram representation of the DC-DC converter of the third embodiment of the present invention.

Next, a description is given of an electric power unit and a control method therefore according to a third embodiment of the present invention with reference to FIG. 10, which is a schematic and block diagram of a DC-DC converter of the third embodiment. The third embodiment is configured such that the low-side switch 4 is directly controlled by the sensor output.

As shown in FIG. 10, the DC-DC converter 1 of the third embodiment has a sensor 15, an AND gate 18, and amplifiers 16 and 17 added to the arrangement of the first embodiment shown in FIG. 1. As in the second embodiment, the sensor 15 detects the current Ilow. The AND gate 18 performs a logical AND operation on the inverse of the output of the sensor 15 and the control signal Cnt2 output from the digital controller 2. The amplifier 16 amplifies the output of the AND gate 18 to drive the gate (or the gate driver) of the low-side switch 4.

That is, the low-side switch is controlled by the sensor 15. The amplifier 17 amplifies the control signal Cnt1.

In the above arrangement, the sensor 15, upon detecting Ilow=0, outputs an output signal at a high level. Then, the output of the amplifier 16 goes low, turning off the low-side switch 4. The sensor output is sent to the digital controller 2 as well. The digital controller performs a different control operation in each of the continuous and discontinuous conduction modes. By being supplied with the sensor output, the digital controller is notified to the effect that the transition from the continuous conduction mode to the discontinuous conduction mode has occurred.

In the DC-DC converter of the third embodiment, the cutoff time is not optimized in the discontinuous conduction mode and the low-side switch 4 is controlled on the basis of the result of detection by the sensor 15. If the detection accuracy of the sensor 15 and the signal delay are such that no problem arises, the efficiency of the DC-DC converter can be increased even with the method of this embodiment.

Figure 11:
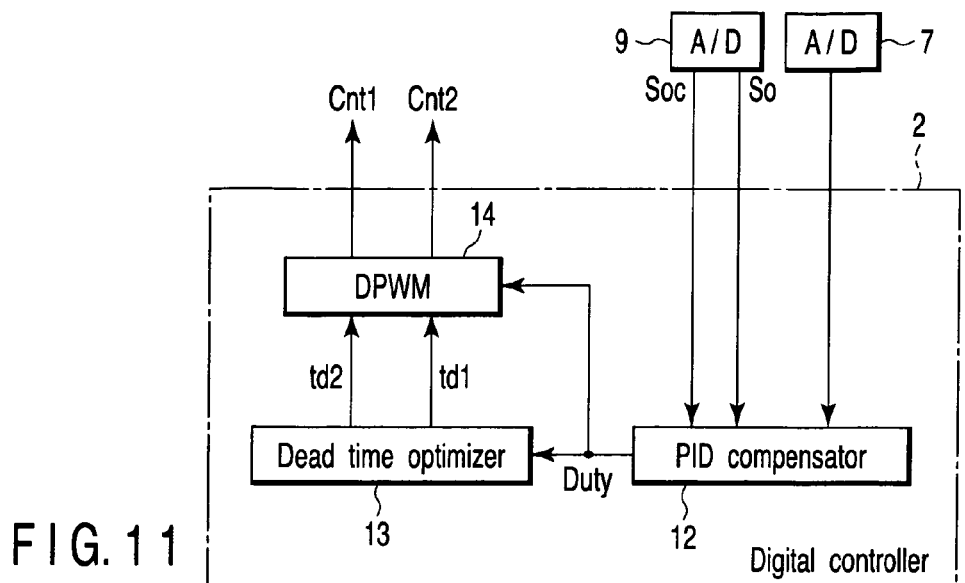
FIG. 11 is a block diagram of a digital controller in a DC-DC converter according to a fourth embodiment of the present invention.

Next, a description is given of an electronic power unit according to a fourth embodiment of the present invention. This embodiment relates to the arrangement of the digital controller 2 in the second embodiment. FIG. 11 is a block diagram of the digital controller 2 according to the fourth embodiment.

As shown in FIG. 11, the digital controller 2 comprises a duty generator 12, a dead time calculator 13, and a control signal generator 14. The duty generator 12 calculates the duty D on the basis of the output of the A/D converter 7 and a zero point signal S0 obtained by the A/D converter 9. The dead time calculator 13 calculates the dead time and the cutoff time on the basis of the duty D obtained from the duty generator 12. The control signal generator 14 produces the control signals Cnt1 and Cnt2 on the basis of the duty D, the dead time, and the cutoff time. The A/D converter 9 may detect not only the zero point but also whether or not the current has exceeded a prescribed value. That is, information indicating whether or not the current Ilow has exceeded the permissible current of the DC-DC converter is sent as a signal Soc to the digital controller 2. The digital controller, upon receipt of the signal Soc, turns off the high-side switch 3 quickly. Such an arrangement allows the prevention of an excessive current flowing in the DC-DC converter.

Figure 12:
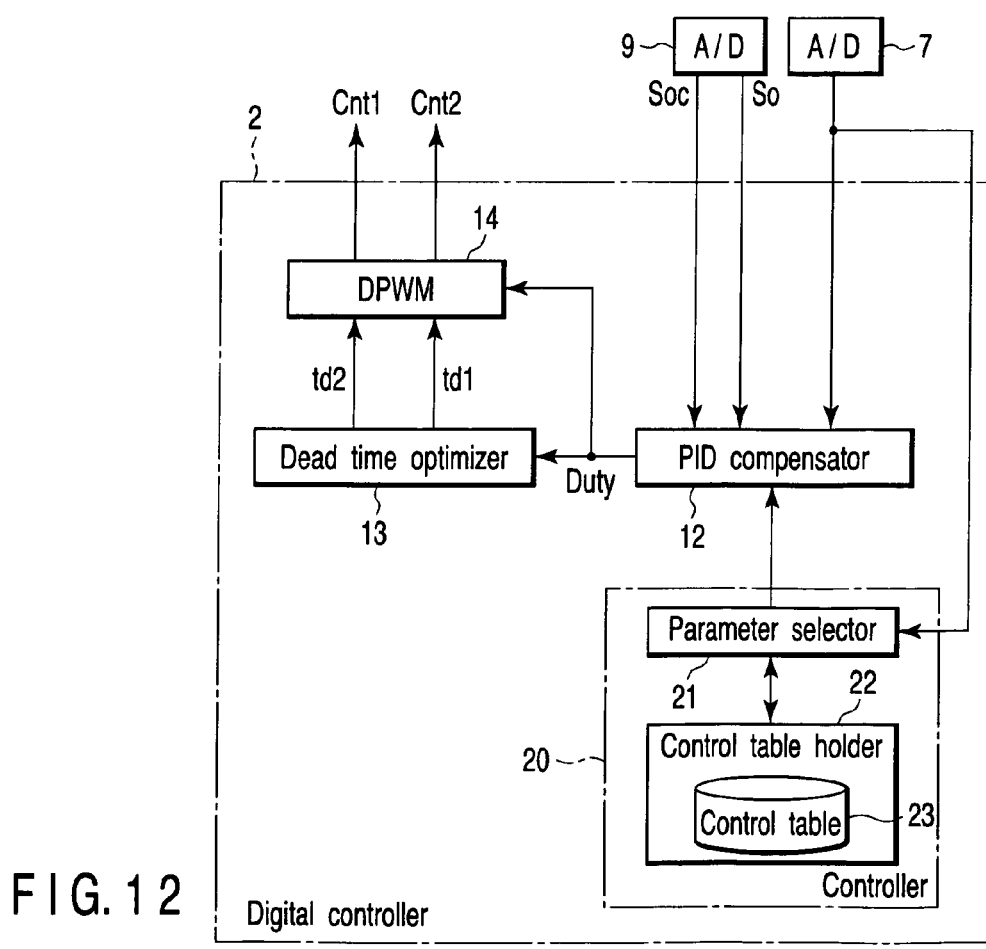
FIG. 12 is a block diagram of a digital control circuit in a DC-DC converter according to a fifth embodiment of the present invention.

Next, an electric power unit of a fifth embodiment of the present invention will be described. Like the fourth embodiment, this embodiment relates to the arrangement of the digital controller 2 and is directed to a modification of the arrangement of the fourth embodiment. FIG. 12 is a block diagram of the digital controller 2 according to the fifth embodiment.

As shown in FIG. 12, the digital controller 2 has a controller 20 added to the arrangement shown in FIG. 11. The controller 20 has a parameter selector 21 and a control table holder 22. The control table holder 22 holds a control table 23 stored with multiple parameters to control the duty generator 12. The parameter selector 21 responds to the output of the A/D converter 7 to read parameters from the control table 23 in the control table holder 22 and controls the duty generator 12 in accordance with the read parameters.

Figure 13:
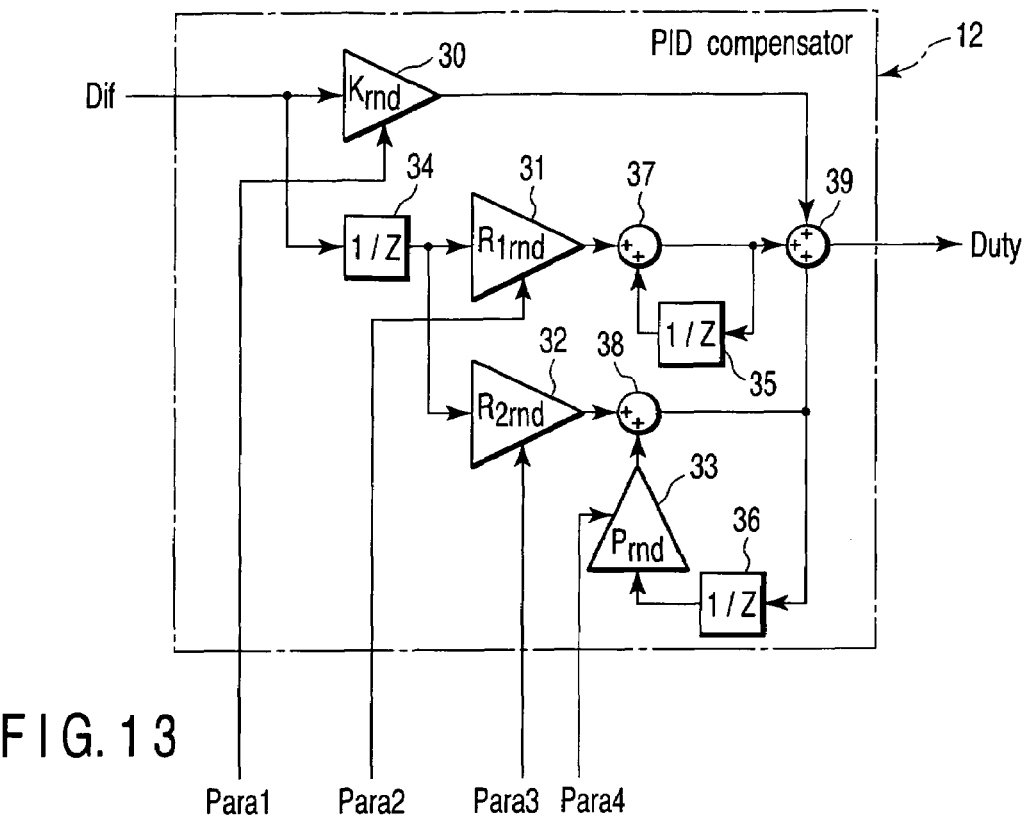
FIG. 13 is a block diagram of a duty control circuit in the DC-DC converter according to the fifth embodiment of the present invention.

FIG. 13 is a circuit diagram of the duty generator 12, which is, for example, a PID (Proportional-Integral-Derivative algorithm) compensator. As shown, the duty generator 12 comprises amplifiers 30 to 33, dividers 34 to 36, and multiplexers 37 to 39. The A/D converter 7 not only detects the output voltage Vout but also calculates the difference Dif between the output voltage Vout and a predetermined reference voltage Vref. The amplifier 30 amplifies the difference Dif. The divider 34 divides the difference Dif. The amplifiers 31 and 32 each amplify the output of the divider 34. The divider 35 divides the output of the multiplexer 37, which multiplexes the outputs of the amplifier 31 and the divider 35. The divider 36 divides the output of the multiplexer 39. The amplifier 33 amplifies the output of the divider 36. The multiplexer 38 multiplexes the outputs of the amplifiers 32 and 33. The multiplexer 39 multiplexes the output of the amplifier 30 and the outputs of the multiplexers 37 and 38. The output of the multiplexer 39 serves as the duty D.

In the above arrangement, the parameter selector 21 reads parameters Para1 to Para4 from the control table 23 according to the difference Dif or the output voltage Vout and controls the amplification factors Krnd, R1$rnd$, R2$rnd$ and Prnd of the respective amplifiers 30 to 33 according to the corresponding read parameters Para1 to Para4.

In addition to the effect (2) of the second embodiment, the electric power unit of the fifth embodiment offers the following effect (3):

(3) The controllability of the electric power unit can be improved.

The characteristics of the conventional PID compensator are uniquely determined at the time of design. It is therefore difficult to arbitrarily change the characteristics of the PID compensator after design.

With the arrangement of this embodiment, however, the digital control circuit 2 has the control table 23. The parameter selector 21 determines the amplification factor of the PID compensator 12 according to the parameters in the control table 23. It is therefore easy to change the characteristics of the PID compensator 12 even after design. Thus, the controllability of the electric power unit can be improved.

Figure 14:
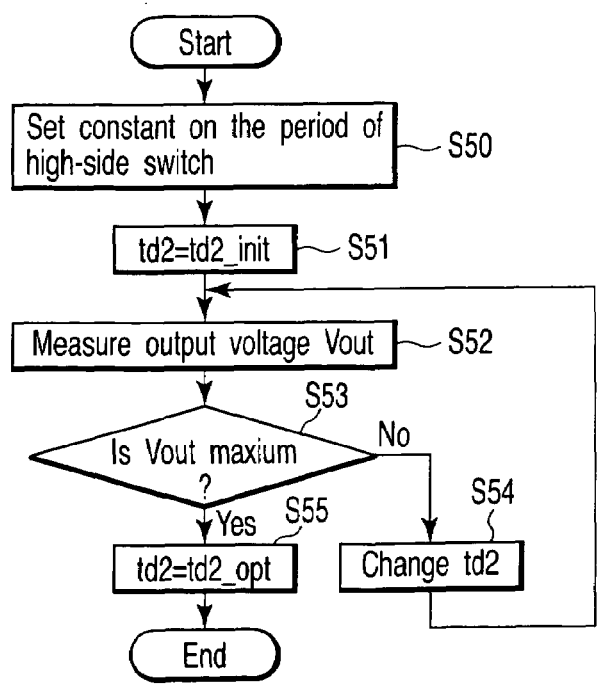
FIG. 14 is a flowchart for the detection of the cutoff time optimum value in a DC-DC converter according to a sixth embodiment of the present invention.

Next, a description is given of an electric power unit and a control method therefor according to a sixth embodiment of the present invention. The six embodiment is directed to a method of searching for the optimum cutoff time by monitoring output voltage Vout with the duty kept constant. The arrangement of the electric power unit of this embodiment remains unchanged from those of the first, second, fourth, and fifth embodiments and hence a description thereof is omitted. FIG. 14 is a flowchart illustrating the cutoff time searching method according to the sixth embodiment.

First, the digital controller 2 makes constant the length of the on-period of the high-side switch 3 (step S50). That is, the duty is set constant. Of course, as in the first and second embodiments, the input conditions are set constant. The digital controller 2 sets the cutoff time td2 to a predetermined initial value td2_init (step S51) and then monitors the output voltage Vout (step S52). A decision is then made as to whether or not the output voltage Vout is maximum (step S53). If not maximum (NO in step S53), the cutoff time td2 is changed (step S54) and a return is made to step S52. If the output voltage is maximum (YES in step S53), the corresponding cutoff time td2 is taken as the optimum value td2_opt.

Figure 15:
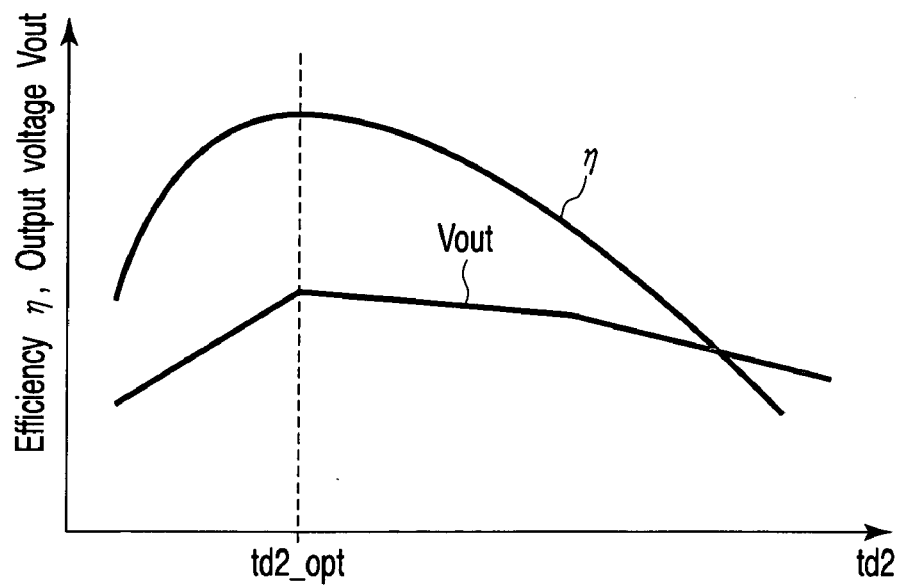
FIG. 15 shows graphs of efficiency and output voltage versus cutoff time in the DC-DC converter according to the sixth embodiment of the present invention.

The searching method is explained using a graph. FIG. 15 is a graph in which the cutoff time td2 is shown on the horizontal axis and the output voltage Vout and the efficiency n of the electric power unit are shown on the vertical axis. As shown, the point at which the output voltage Vout is maximum is also the point at which the efficiency n is maximum. Therefore, the point at which the output voltage Vout is maximum is the optimum cutoff time. Therefore, the present embodiment monitors the output voltage Vout while changing the cutoff time and determines the optimum cutoff time on the basis of the point at which the output voltage Vout is maximum.

The method of the present embodiment offers an effect that the search of the optimum cutoff time can be speeded up in addition to the effect (1) and (2) of the first and second embodiments. With the method of the sixth embodiment, the optimum cutoff time is searched for by monitoring the output voltage Vout while changing the cutoff time. That is, the output voltage Vout varies while the cutoff time is searched for. It is therefore difficult to use the electric power unit as an electric power unit itself. However, even with the methods according to the first and second embodiments, the input/output conditions have to be set constant. Depending on circumstances, therefore, the electric power unit may not be used as an electric power unit while the search for the cutoff time is made. In such a case, it is desirable to use the method of the present embodiment from a speedup viewpoint.

The method according to the sixth embodiment can also be used as a method of searching for the dead time td1 in the discontinuous conduction mode or a method of searching for the dead times td1 and td2 in the continuous conduction mode.

The process in step S53 in FIG. 14 remains unchanged from the method described with reference to FIGS. 5 and 6. That is, the output voltage Vout is monitored while changing the cutoff time td2. For example, when a decrease in the cutoff time td2 causes the output voltage Vout to rise, the cutoff time is decreased until the output voltage switches from rising to decreasing. The optimum cutoff time can be known from the point at which the output voltage Vout switches from rising to decreasing. Conversely, when an increase in the cutoff time results in an increase in the output voltage Vout, the cutoff time td2 is simply increased until the output voltage switches from rising to decreasing.

As described above, the DC-DC converters according to the first and second embodiments of the present invention monitors the duty D while changing the cutoff time and selects the time at which the duty is minimum as the optimum cutoff time. Therefore, the efficiency of the DC-DC converter can be increased. In particular, the method according to the first embodiment allows the optimum value to be determined with no sensor. The second embodiment allows the optimum cutoff time value to be determined quickly though a sensor is used.

Furthermore, the DC-DC converter according to the sixth embodiment monitors the output voltage Vout while changing the cutoff time and selects the time at which the output voltage is maximum as the optimum cutoff time. Thus, the same advantages as in the first and second embodiments can be obtained and the cutoff time can be optimized at high speed.

Figure 5:
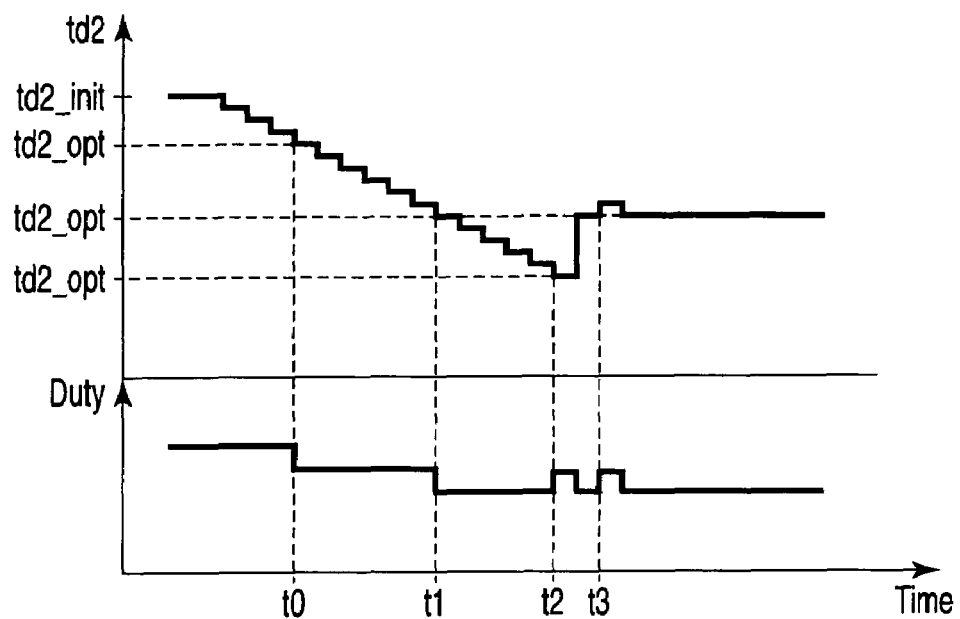
FIG. 5 shows graphs illustrating a relationship between the cutoff time and the duty in the DC-DC converter shown in FIG. 1.
Figure 6:
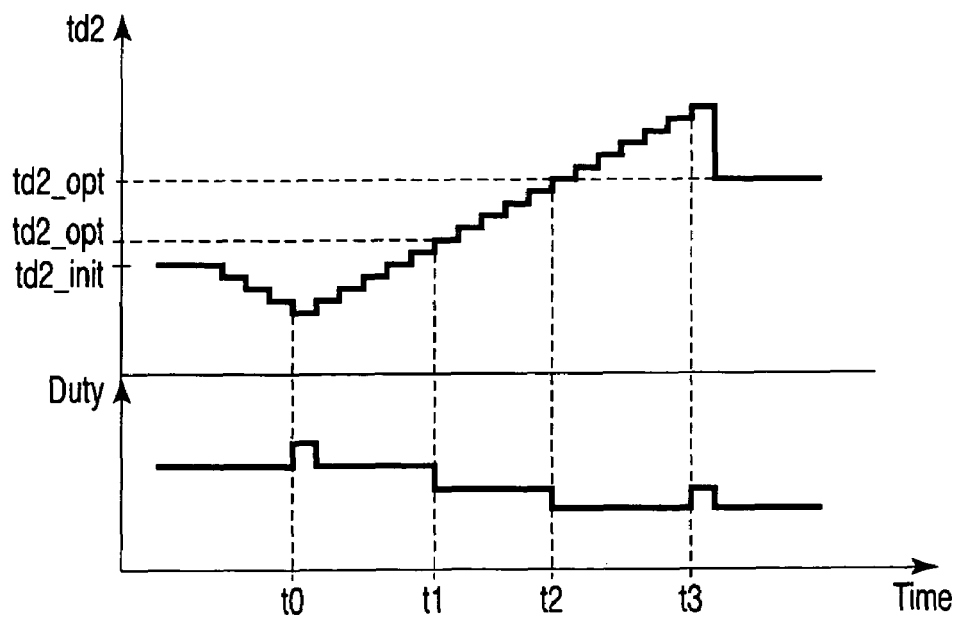
FIG. 6 shows graphs illustrating a relationship between the cutoff time and the duty in the DC-DC converter shown in FIG. 1.

The method described using FIGS. 4 to 6 is not particularly limited to this method. A method which can search for the point at which the duty is minimum may be used. The second and third embodiments may be used in combination.

In FIGS. 5 and 6, the value at time t2 is selected as the optimum value of the cutoff time td2. However, as the optimum value, any value for which the duty D is minimum is sufficient. Naturally, any value obtained at period between the times t2 and t3 may be selected.

Figure 16:
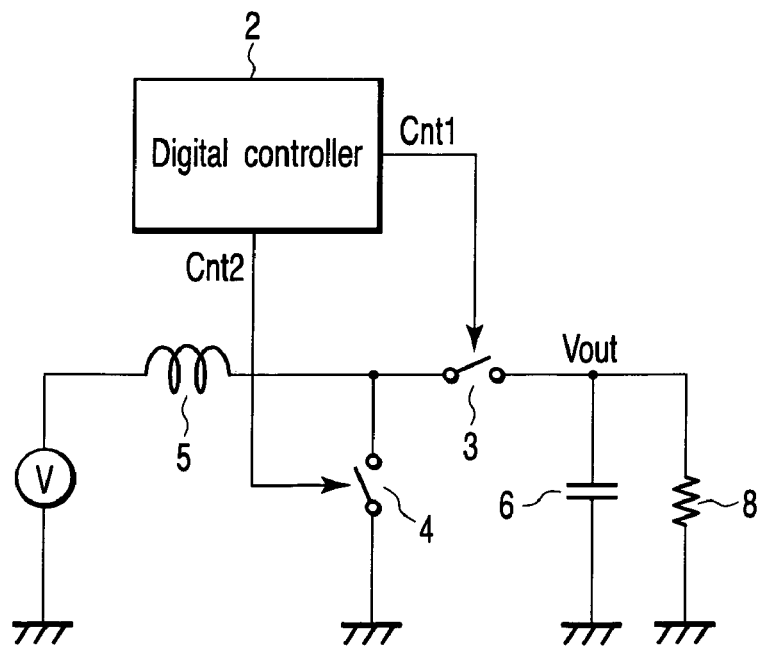
FIG. 16 is a schematic and block diagram representation of a DC-DC converter according to a modification of the first through sixth embodiments of the present invention.

The DC-DC converter may be arranged as shown in FIG. 16. FIG. 16 shows the block diagram of a boost converter. As shown, the inductor 5 has its one end connected to the supply voltage Vcc and its other end connected to the high- and low-side switches 3 and 4. The inductor 5 and the load 8 are connected together by the high-side switch 3. Of course, the DC-DC converter may be modified in various ways.

Figure 17:
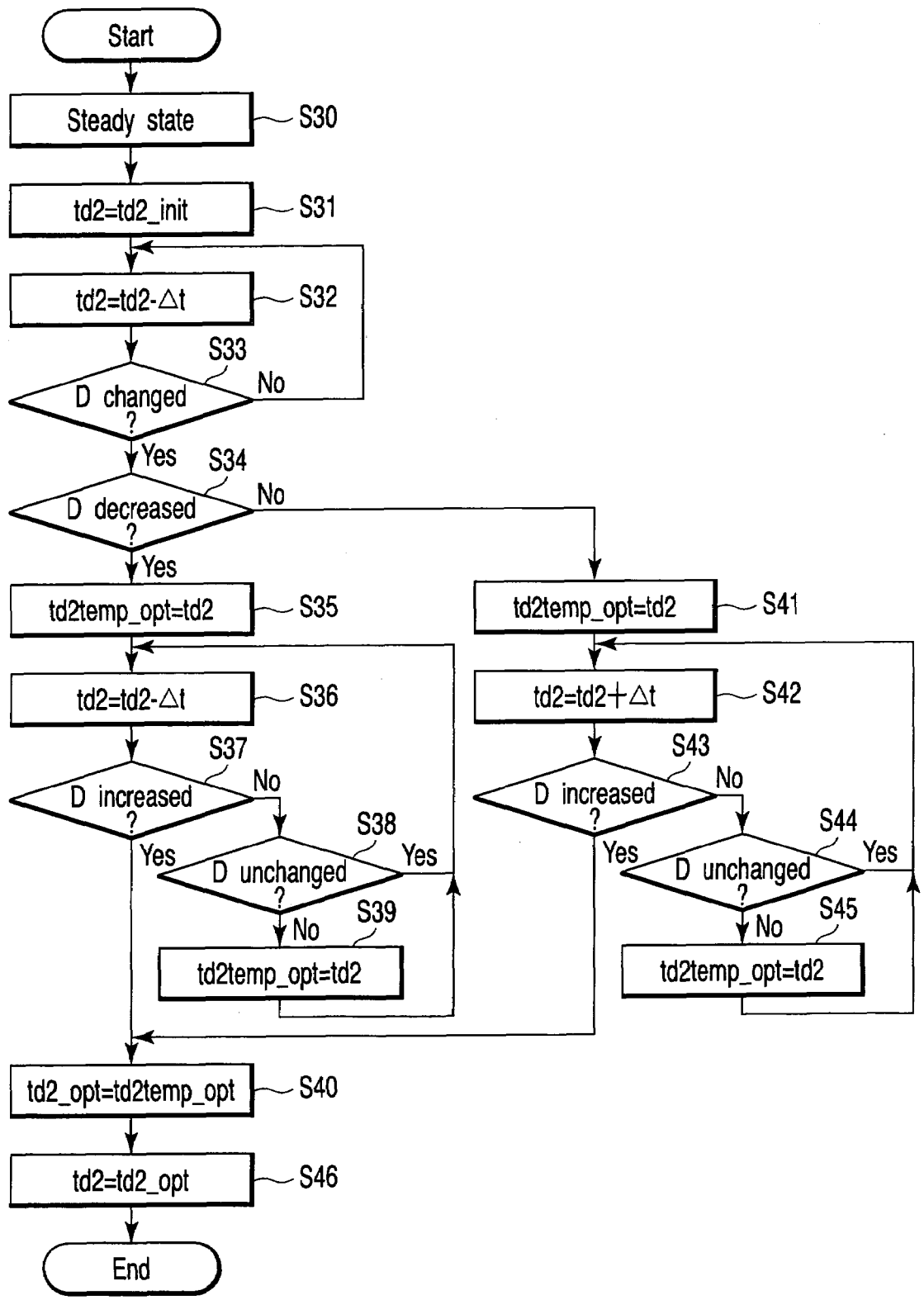
FIG. 17 is a flowchart for the detection of the cutoff time optimum value in a DC-DC converter according to a modification of the first and second embodiments of the present invention.

The flowchart shown in FIG. 4 can be modified as shown in FIG. 17. First, to make the current IL constant, the digital controller 2 puts the DC-DC converter 1 in the steady state (step S30). Then, the cutoff time td2 is set to the initial value td2_init (step S31). The digital controller 2 resets the duty D as well each time it resets the cutoff time td2. The efficiency of the DC-DC converter 1, i.e., the output voltage Vout changes with changing cutoff time. The duty D is therefore set to a new value so that the output voltage Vout becomes constant.

Next, the cutoff time td2 is changed to (td2−Δt) (step S32). That is, the cutoff time td2 is set Δt shorter than the initial value td2_init. There is no limit to the length of Δt. However, the shorter the length of Δt, the more accurately the optimum value can be found. A decision is made as to whether or not the duty D has changed by step S32 (step S33). If the duty D has not changed, then a return is made to step S32 to further shorten the cutoff time. If the duty D is decided to have changed in step S33, then a decision is made as to whether or not the duty D has decreased (step S34). Hereinafter, the case where D has decreased and the case where D has increased will be described separately.

Figure 18:
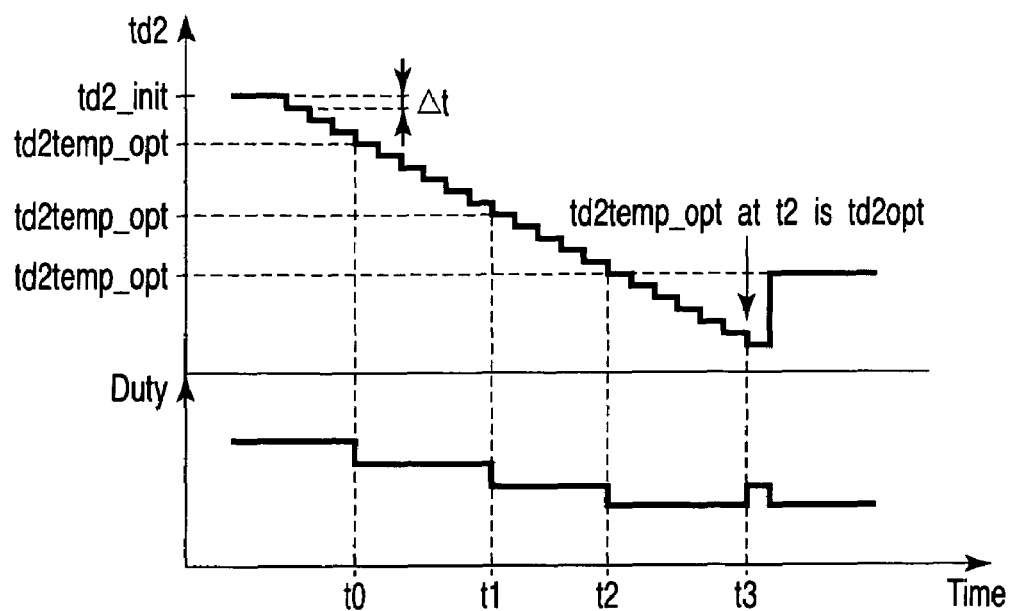
FIG. 18 shows graphs illustrating a relationship between the cutoff time and the duty in the DC-DC converter according to the modification of the first and second embodiments of the present invention.

First, the case where D has decreased will be described with reference to FIG. 18. That the duty D decreases by repeating step S32 to decrease the cutoff time td2 corresponds to CASE 1 described in conjunction with FIG. 3. As shown in FIG. 14, the cutoff time td2 at the time (t0) when the duty D decrease is set as the temporary optimum value td2temp_opt (step S35). After that, the cutoff time td2 is further shortened by Δt (step S36). When the duty D does not increase (NO in step S37) and does not decrease (YES in step S38), a return is made to step S36 to further shorten the cutoff time td2. When the duty D decreases (NO in step S38), the temporary optimum value td2temp_opt is replaced with the cutoff time at that time (step S39, times t1 and t2). Repeating steps S36 to S39 corresponds to gradually shortening the cutoff time from time t3 to time t4 as described using FIG. 3. Then, the current IL becomes zero sometime. That the current IL has passed zero can be known from the fact that the duty D which has continued to decrease switches to increasing in step S37 (time t3 in FIG. 18). Therefore, when the duty D increase in step S37, the temporary optimum value td2temp_opt at that time is set as the final optimum value td2_opt of the cutoff time td2 (step S46).

Figure 19:
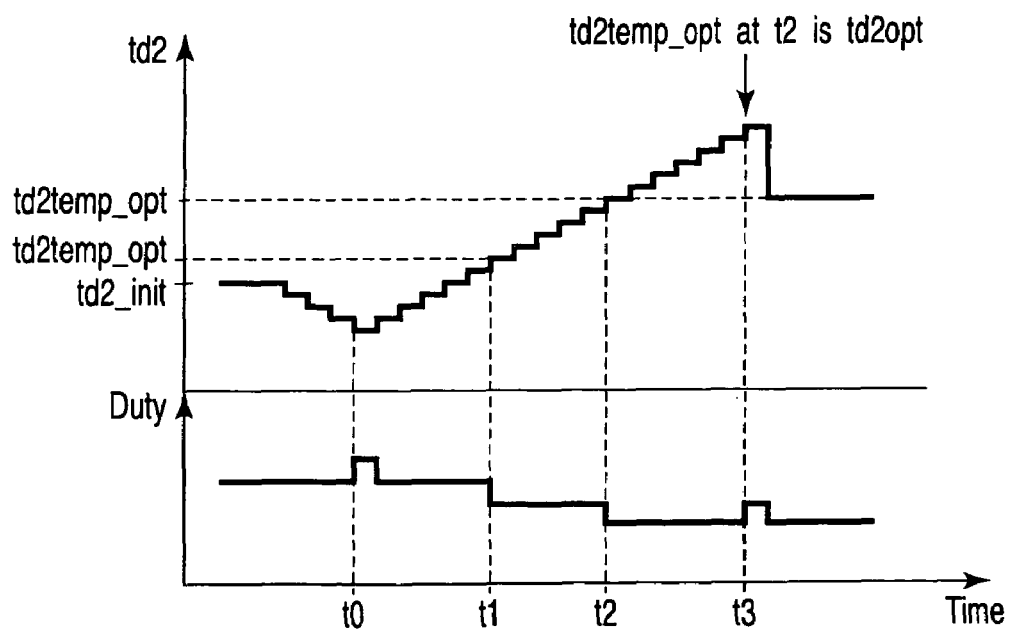
FIG. 19 shows graphs illustrating a relationship between the cutoff time and the duty in the DC-DC converter according to a modification of the first and second embodiments of the present invention.

Next, the case where D has increased in step S34 will be described with reference to FIG. 19. First, as with CASE 1, the cutoff time td2 at that time is set as the temporary optimum value td2temp_opt (step S41). That the duty D increases (time t0 in FIG. 19) by decreasing the cutoff time td2 corresponds to CASE 2 described in conjunction with FIG. 3. The direction to change the cutoff time is changed. That is, the cutoff time is lengthened as opposed to being shortened. In step S42, the cutoff time is lengthened by Δt. When the duty D does not increase (NO in step S43) and does not decrease (YES in step S44), a return is made to step S42 to further lengthen the cutoff time td2. When the duty D decreases (NO in step S44), the cutoff time at that time is set as the temporary optimum value td2temp_opt (times t1 and t2 in FIG. 19). Repeating steps S42 to S45 corresponds to gradually lengthening the cutoff time from time t3 to time t2 as described using FIG. 3. Then, the current IL becomes zero sometime. That the current IL has passed zero can be known from the fact that the duty D which has continued to decrease switches to increasing in step S43 (time t3 in FIG. 18). Therefore, when the duty D increases in step S43, the temporary optimum value td2temp_opt at that time is set as the final optimum value td2_opt of the cutoff time td2.

In this way, the cutoff time td2 can be optimized.

Although the cutoff time is shortened by Δt in step S32, it may be lengthened by Δt. The reason is that the processes in steps S32 to S34 are merely performed to judge CASE 1 or CASE 2 in FIG. 3 and thus the procedure may be performed in the direction to lengthen the cutoff time or in the direction to shorten the cutoff time.

As shown in FIG. 20, the high-side switch 3 may be formed of a p-channel MOS transistor. In that case, its gate potential (control signal Cnt1) is referenced to the source at a constant potential. Thus, the arrangement of the gate driver circuit can be simplified. When the high-side switch 3 is formed of an p-channel MOS transistor, its on resistance can be reduced. FIG. 20 shows the use of an p-channel MOS transistor in the arrangement described in the first embodiment. A p-channel transistor can be used as the high-side switch 3 in the arrangements of the second and third embodiments as well.

Although, as shown in FIG. 7, the sensor 15 detects the current in the low-side switch 4, the current flowing in the inductor 5 may be detected. Even in this case, the methods described so far can be used.

Figure 21:
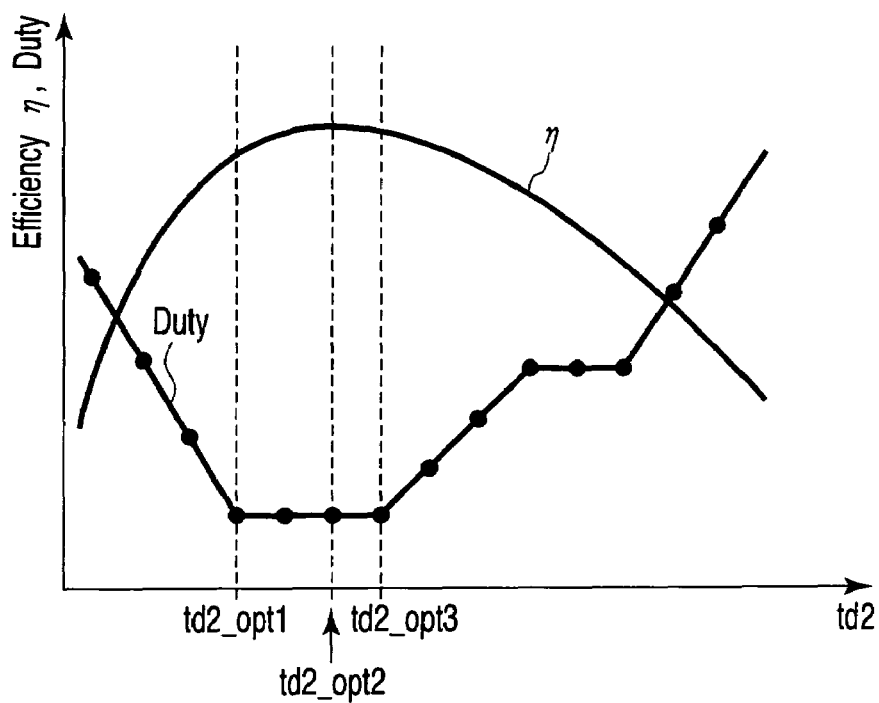
FIG. 21 shows graphs of efficiency and duty versus cutoff time in the DC-DC converter according to a modification of the first and second embodiments of the present invention.
Figure 22:
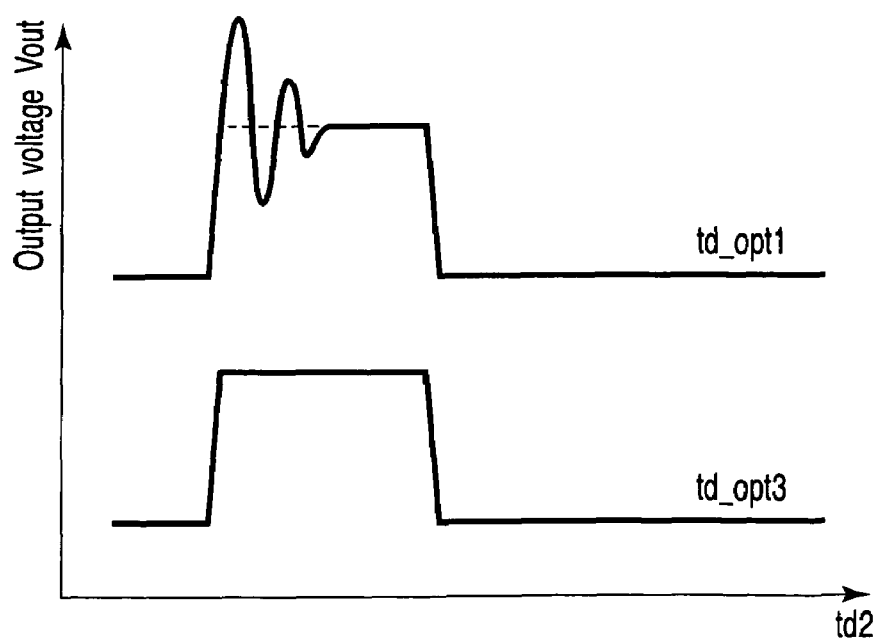
FIG. 22 shows waveforms of output voltages in the DC-DC converter according to the modification of the first and second embodiments of the present invention.

With the methods according to the first and second embodiments, two or more cutoff times may exist at which the duty D is minimum. FIG. 21 shows graphs in which the cutoff time td2 is shown on the horizontal axis and the efficiency η and the duty D are shown on the vertical axis. Suppose that, as shown, there are two or more cutoff times at which the duty is minimum and, of these cutoff times, the shortest cutoff time is td2_opt1, the cutoff time at which the efficiency is maximum is td2_opt2, and the longest cutoff time is td2_opt3. In such a case, it is desirable to use the longest cutoff time td2_opt3 as the optimum value. FIG. 22 shows the waveforms of output voltage Vout when the cutoff times td2_opt1 and td2_opt3 are used. As shown, when the cutoff time is shorter (when td2_opt1 is used), ringing occurs, which may result in an increase in loss. It is therefore desirable to make the cutoff time used longer (to use td2_opt3). Of course, depending on specifications, it is allowed to use td2_opt2 at which the efficiency is maximum.

Figure 23:
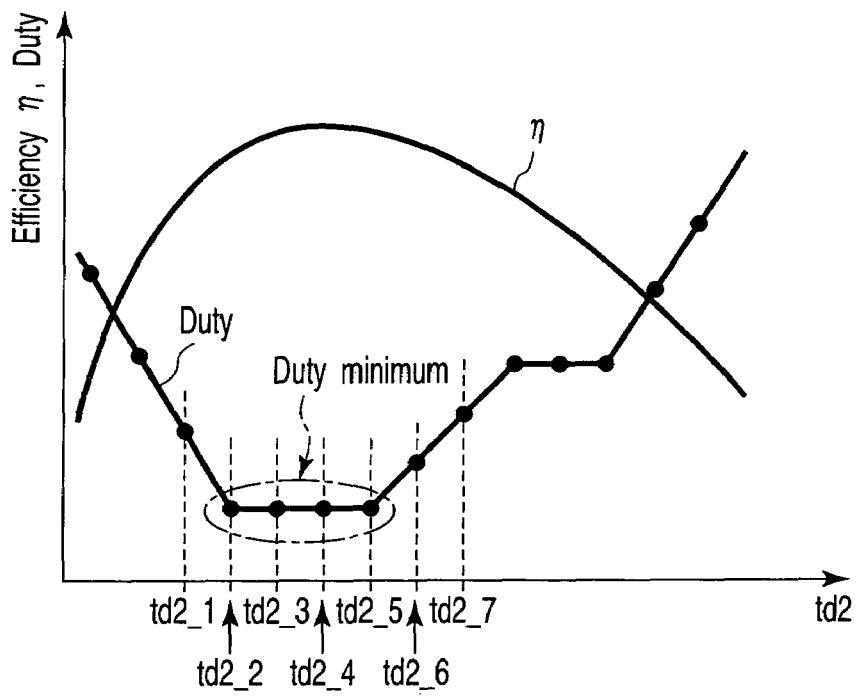
FIG. 23 shows graphs of efficiency and duty versus cutoff time in the DC-DC converter according to the modification of the first and second embodiments of the present invention.

In the first and second embodiments, the cutoff time at which the duty is minimum is used as the optimum value. However, the duty does not necessarily need to be minimum. Depending on the specifications of the DC-DC converter, it may be desired to operate more safely rather than making the efficiency maximum. In such a case, a cutoff time at which the duty is greater than minimum is used as the optimum value. FIG. 23 shows graphs of efficiency and duty versus cutoff time. As shown, suppose that the cutoff times at which the duty is minimum are td2_2, td2_3, td2_4, and td2_5. The first and second embodiments have been described taking an example of using one of these cutoff times as the optimum value. However, it is not necessarily required to use these cutoff times as the optimum value. It is also possible to use one of the cutoff times td2_1, td2_6, and td2_7 at which the duty is greater than minimum as the optimum value. That is, the optimum cutoff-time can be selected according to the cutoff-time at which the duty is minimized. Therefore, the embodiments are not limited to the cutoff times at which the duty is minimum. The optimum value is simply determined according to the duty.

Figure 24:
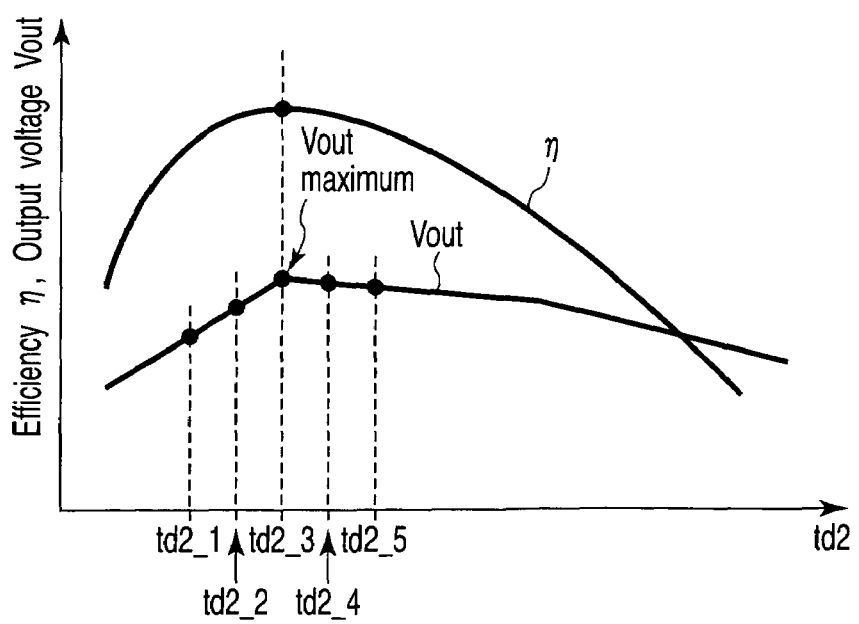
FIG. 24 shows graphs of efficiency and output voltage versus cutoff time in a DC-DC converter according to a modification of the sixth embodiment of the present invention.

The same holds true for the sixth embodiment. FIG. 24 shows graphs of efficiency and output voltage versus cutoff time. As shown, suppose that the cutoff time at which the output voltage Vout is maximum is td2_3. The sixth embodiment has been described taking an example of using the cutoff time td2_3 as the optimum value. However, it is not necessarily required to use td2_3 as the optimum value. It is also possible to use one of the cutoff times td2_1, td2_2, td2_4, and td2_5 at which the output voltage is lower than maximum as the optimum value. That is, the embodiment is not limited to the cutoff times at which the output voltage is maximum. The optimum value is simply determined according to the output voltage.

Figure 25:
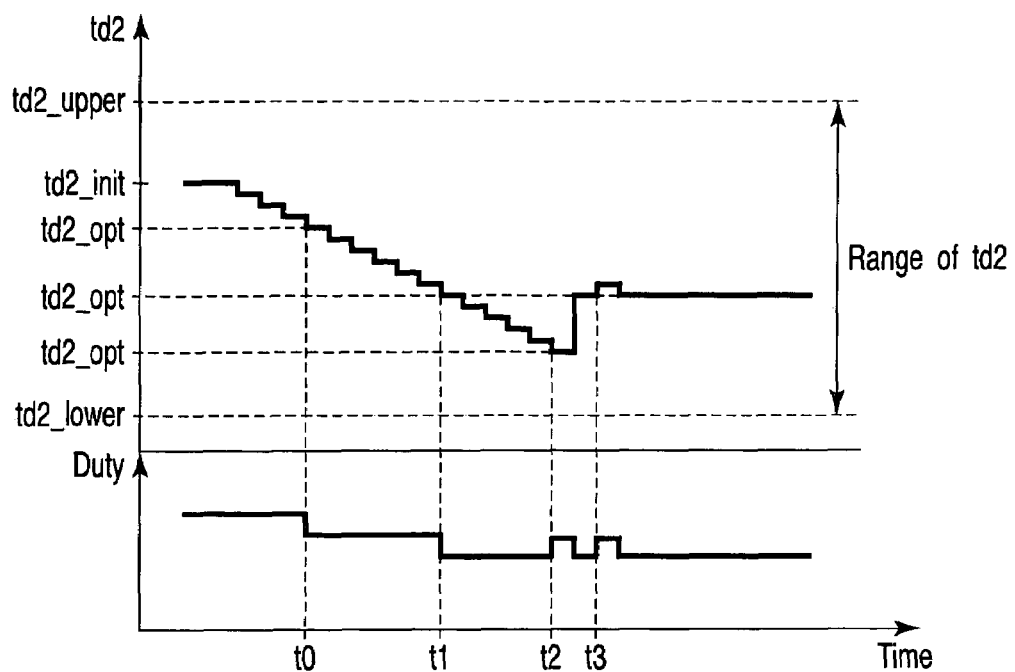
FIG. 25 shows graphs of duty and cutoff time versus time in the DC-DC converter according to a modification of the first and second embodiments of the present invention.

In the methods according to the first and second embodiments, a range over which the cutoff time is set may be determined in advance. FIG. 25 shows graphs in which the cutoff time and the duty are shown on the vertical axis and the time is shown on the horizontal axis. As shown, the lower limit value td2_lower and the upper limit value td2_upper of the cutoff time are set and the cutoff time is made variable only between these values. This approach can prevent the flow of excessive current in the electric power unit due to the cutoff time being greatly displaced from the optimum value.

In the arrangements of the first through sixth embodiments, it is desirable to use a resistor of very high resistance or a constant-current load as the load 8 at the time of setting the cutoff time from a viewpoint of protection of the DC-DC converter. The constant-current load is one in which flowing current is constant with respect to voltage.

In the DC-DC converters of the first through sixth embodiments, the high- and low-side switches 3 and 4 are formed on the same semiconductor substrate. In addition, the digital controller 2 may also be formed on the same semiconductor substrate.

Figure 26:
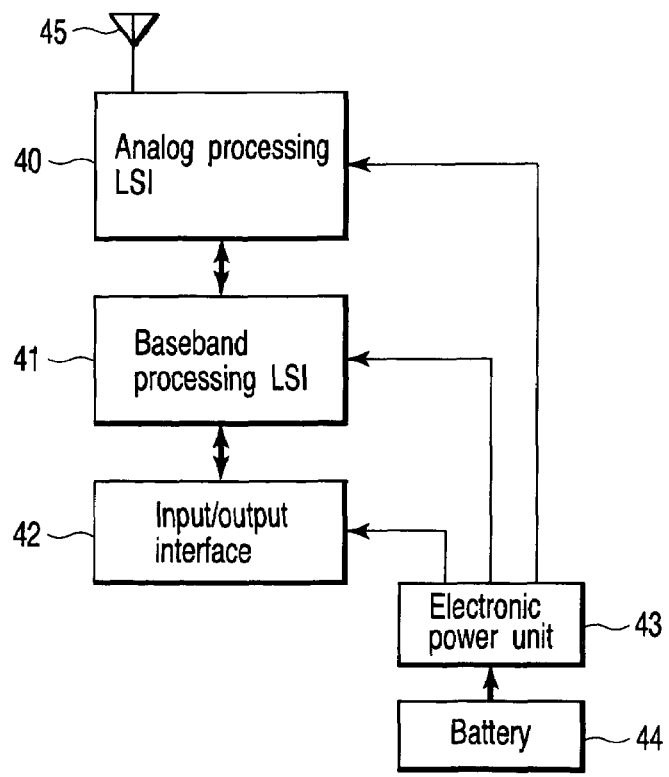
FIG. 26 is a block diagram of a mobile phone equipped with a DC-DC converter according to one of the first through sixth embodiments of the present invention.

The electronic power units described so far are adaptable to a large number of applications. FIG. 26 is a schematic block diagram of a mobile phone as one of the applications. As shown, the mobile phone comprises an analog processing LSI 40, a baseband processing LSI 41, an input/output interface 42, an electric power unit 43, a battery 44, and an antenna 45. The electric power unit 43 converts a voltage of the order of 3 to 5 V from the battery to a given range of voltages for application to the analog processing LSI 40, the baseband processing LSI 41, and the input/output interface 42. The input/output interface 42 includes input number keys and a display unit such as a liquid crystal display. The analog processing LSI 40 amplifies analog signals to be received or transmitted through radio communication and transmits or receives data from the antenna 45. The baseband processing LSI 41 processes data input from the input/output interface or data from the analog processing LSI 40.

In the above arrangement, as the electronic power unit 42 use may be made of the DC converters of the first through sixth embodiments. The analog processing LSI 40, the baseband processing LSI 41 and the input/output interface 42 form the load 8 in the above embodiments.

In the embodiments described above, a lower limit may be set for the value of the cutoff time. In this case, the cutoff time is set anew if the optimum value of the cutoff time td2_opt decreases below the lower limit. This prevents the cutoff time from attaining a value that is apparently inappropriate (e.g., a negative value). This ultimately prevents the DC-DC converter 1 from malfunctioning.

More specifically, the lower limit is stored in the digital controller 2 stores. The digital controller 2 compares the lower limit with the cutoff time it has calculated. If the cutoff time calculated is smaller than the lower limit, the digital controller 2 starts setting the cutoff time anew.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic power unit having a continuous conduction mode in which a current flowing in the load is more than zero and a discontinuous conduction mode in which a current flowing in the load takes a negative value or zero for a specific period, the unit comprising:
 a first MOS transistor which applies a voltage to the load;
 a second MOS transistor which remains on while the first MOS transistor remains off and which rectifies the current flowing in the load;
 a digital control circuit which turns on the first transistor upon a lapse of a first time interval from a time the second MOS transistor is turned off and which turns on the second MOS transistor upon a lapse of a second time interval from a time the first MOS transistor is turned off, the digital control circuit controlling the on-period of the first MOS transistor so that the voltage applied to the load is constant in the discontinuous conduction mode, and determining, while the voltage applied to the load is constant, an optimal value of the first time interval from a duty which is a ratio of the on-period to a sum of the on- and off-periods of the first MOS transistor in one cycle; and
 a sensor which detects a current flowing in the second MOS transistor or an output voltage of the second MOS transistor;
 wherein the digital control circuit searches for the first time interval at which the duty is minimum with reference to a time at which an arbitrary current value is detected by the sensor, obtains a time difference between the time that the arbitrary current value is detected and a start time of the first time interval, and outputs a control signal to turn off the second MOS transistor after a lapse of a time difference from the detection of the arbitrary current value by the sensor.

2. The unit according to claim 1, wherein the digital control circuit determines the optimal value of the first time interval with reference to the first time interval at which the duty is minimized.

3. The unit according to claim 1, wherein the digital control circuit sets the first time interval at which the duty is minimized as the optimal value.

4. The unit according to claim 1, wherein the digital control circuit includes a duty generator which determines the duty according to the voltage;
 a first time interval calculator which calculates the first time interval in accordance with the duty determined by the duty generator; and
 a first controller which controls the on and off of the first and second MOS transistors according to the first time interval calculated by the first time interval calculator.

5. The unit according to claim 4, wherein the digital control circuit further includes a holder which holds a control table to store parameters used in determining the duty in the duty generator; and
 a second controller which reads the parameters from the control table according to the voltage and controls the duty generator according to the read parameters, and
 the duty generator determines the duty on the basis of the voltage and control by the second controller.

6. The unit according to claim 1, wherein the digital control circuit has first and second operation modes,
 the digital control circuit determines the optimal value of the first time interval in the first operation mode, and
 the digital control circuit, in the second operation mode, controls the first and second MOS transistors using the optimal value of the first time interval determined in the first operation mode.

7. The unit according to claim 1, wherein the first and second MOS transistors and the digital control circuit are formed on a semiconductor substrate.

8. A method of controlling an electric power unit which has a first MOS transistor which applies a voltage to a load and a second MOS transistor which rectifies a current flowing in the load, the first and second MOS transistors being turned on alternately, and in which, in a discontinuous conduction mode in which the current takes a negative value or zero for a specific period, the first MOS transistor being turned on by a first control signal, the second MOS transistor being turned off by a second control signal, the first control signal being output upon a lapse of a time interval from a first time point at which the second control signal is output, the method comprising:
 detecting, using a sensor, a second time point at which a current flowing in the second MOS transistor reaches an arbitrary value; and
 setting an interval from the second time point to a third time point at which a first control signal is output as an initial value of the time interval;
 determining one of a case where the time interval is decreased from the initial value, and a case where the time interval is increased from the initial value, in which a duty which is a ratio of the on-period to a sum of the on- and off-periods of the first MOS transistor in one cycle decreases;
 decreasing the time interval with the voltage applied to the load kept constant until the duty starts increasing, if it is determined that the duty decreases when the time interval is decreased;
 increasing the time interval with the voltage delivered to the load kept constant until the duty starts increasing, if it is determined that the duty decreases when the time interval is increased;
 determining an optimal value of the time interval according to the time interval at which the duty immediately before the duty starts increasing is obtained,
 wherein the second control signal is output upon a lapse of a time difference between the initial and optimal values from the second time point.

9. The method according to claim 8, wherein the time interval at which the duty immediately before the duty starts increasing is obtained is selected as the optimal value of the time interval.

10. The method according to claim 8, wherein the time interval at which the minimum duty is obtained is selected as the optimal value of the time interval.

11. The method according to claim 10, wherein, when the minimum duty is obtained in a plurality of time intervals, one of the time intervals which is the longest is selected as the optimal value.

12. The method according to claim 10, wherein the time interval is increased or decreased within a predetermined range.

* * * * *